US012604167B2

(12) United States Patent
Yang

(10) Patent No.: US 12,604,167 B2
(45) Date of Patent: Apr. 14, 2026

(54) APPLICATION-BASED SHORT-RANGE NOTIFICATION METHOD, ELECTRONIC DEVICE, AND SYSTEM

(71) Applicant: HUAWEI TECHNOLOGIES CO., LTD., Shenzhen (CN)

(72) Inventor: Biao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 624 days.

(21) Appl. No.: 18/001,030

(22) PCT Filed: May 31, 2021

(86) PCT No.: PCT/CN2021/097358
§ 371 (c)(1),
(2) Date: Dec. 7, 2022

(87) PCT Pub. No.: WO2021/249231
PCT Pub. Date: Dec. 16, 2021

(65) Prior Publication Data
US 2023/0269567 A1 Aug. 24, 2023

(30) Foreign Application Priority Data

Jun. 10, 2020 (CN) ......................... 202010522551.X

(51) Int. Cl.
*H04W 4/80* (2018.01)
*H04W 4/14* (2009.01)

(52) U.S. Cl.
CPC ............... *H04W 4/80* (2018.02); *H04W 4/14* (2013.01)

(58) Field of Classification Search
CPC .................................. H04W 4/80; H04W 4/14
See application file for complete search history.

(56) References Cited

U.S. PATENT DOCUMENTS

| | | | |
|---|---|---|---|
| 9,179,256 B1* | 11/2015 | Pietraniec ............. | H04W 4/021 |
| 10,164,776 B1 | 12/2018 | Perdomo | |
| 10,909,602 B1* | 2/2021 | Gailloux ............ | G06Q 10/0875 |
| 11,126,988 B2* | 9/2021 | Dunjic ................... | G06Q 20/10 |
| 2004/0067773 A1 | 4/2004 | Rachabathuni et al. | |
| 2014/0364089 A1* | 12/2014 | Lienhart ................. | H04W 4/12 |
| | | | 455/412.2 |
| 2016/0165056 A1* | 6/2016 | Bargetzi ................ | G06F 3/1454 |
| | | | 455/416 |

(Continued)

FOREIGN PATENT DOCUMENTS

| | | |
|---|---|---|
| CN | 104735524 A | 6/2015 |
| CN | 104898958 A | 9/2015 |

(Continued)

OTHER PUBLICATIONS

Extended European Search Report in European Appln No. 21821808. 9, dated Oct. 9, 2023, 6 pages.

*Primary Examiner* — David Bilodeau
(74) *Attorney, Agent, or Firm* — Fish & Richardson P.C.

(57) ABSTRACT

One example method includes running, by the first device, a first application, and identifying a first scenario; and sending, by the first device, a first message to a second device by using a short-range wireless communication technology, where the first message carries an identifier of the first application and an identifier of the first scenario, and the first application is installed on the first device.

19 Claims, 11 Drawing Sheets

(56)  References Cited

U.S. PATENT DOCUMENTS

| 2016/0261425 A1* | 9/2016 | Horton | H04L 67/1097 |
| 2016/0262014 A1* | 9/2016 | Zeng | H04W 8/18 |
| 2017/0223163 A1* | 8/2017 | Li | H04M 3/537 |
| 2019/0200276 A1 | 6/2019 | Kinugawa et al. | |

FOREIGN PATENT DOCUMENTS

| CN | 104980883 A | 10/2015 |
| CN | 105340303 A | 2/2016 |
| CN | 106385662 A | 2/2017 |
| CN | 110753312 A | 2/2020 |
| CN | 112333644 A | 2/2021 |

* cited by examiner

Graphical user interface 52

Graphical user interface 72

APPLICATION-BASED SHORT-RANGE NOTIFICATION METHOD, ELECTRONIC DEVICE, AND SYSTEM

CROSS-REFERENCE TO RELATED APPLICATIONS

This application is a national stage of International Application No. PCT/CN2021/097358, filed on May 31, 2021, which claims priority to Chinese Patent Application No. 202010522551.X, filed on Jun. 10, 2020. Both of the aforementioned applications are hereby incorporated by reference in their entireties.

TECHNICAL FIELD

This application relates to the field of short-range wireless communication technologies, and in particular, to an application-based short-range notification method, an electronic device, and a system.

BACKGROUND

With development of communication technologies, more and more applications (application, APP) are installed in an electronic device such as a mobile phone. Applications can push various notification messages to a user. A notification message sent by an electronic device to another nearby electronic device based on an application may be widely applied to various scenarios, and can improve user activeness, user loyalty, a conversion rate, and a retention rate. Currently, electronic devices can send notification messages to each other only by relying on the Internet. This results in poor flexibility and a risk of disclosing user privacy. How to send/receive a notification message more conveniently and effectively based on an application is a current and future research direction.

SUMMARY

Embodiments of this application provide an application-based short-range notification method, an electronic device, and a system, so that the electronic device can send/receive a short-range message more flexibly, conveniently, and effectively, and disclosure of user privacy can be avoided.

According to a first aspect, an embodiment of this application provides an application-based short-range notification method, where the method is applied to a communication system, the communication system includes a first device and a second device, and a first application is installed on both the first device and the second device. The method includes: the first device runs the first application and identifies a first scenario; the first device sends a first message by using a short-range wireless communication technology, where the first message carries an identifier of the first application and an identifier of the first scenario; the second device receives the first message by using the short-range wireless communication technology, and determines the first application and the first scenario based on the first message; and the second device outputs prompt information, where the prompt information is used to indicate the first application and the first scenario.

Implementation of the method provided in the first aspect may be independent of the Internet, and transmission of a short-range message can be completed by using only the short-range wireless communication technology. The method is directly performed between electronic devices, and no additional server needs to be configured, so that costs of short-range notification are reduced. In addition, a short-range message transmitted between electronic devices carries only an identifier of an application and an identifier of a notification scenario, so that disclosure of privacy data such as personal location information and a personal account of a user can be avoided.

With reference to the first aspect, in some embodiments, a short-range wireless communication technology may include but is not limited to Bluetooth (Bluetooth, BT), near field communication (near field communication, NFC), a wireless local area network (wireless local area networks, WLAN) (such as wireless fidelity (wireless fidelity, Wi-Fi)), ZigBee, ultra wideband (ultra wideband, UWB), or the like.

With reference to the first aspect, in embodiments of this application, both the first device and the second device store one or more notification scenarios corresponding to the first application and an identifier corresponding to each notification scenario, where the one or more notification scenarios include the first scenario. In this way, it can be ensured that the first device can identify the first scenario and send the first message, and it can be further ensured that the second device can parse the first message.

With reference to the first aspect, in some embodiments, the one or more notification scenarios corresponding to the first application may be preset, or may be updated in real time. When the one or more notification scenarios corresponding to the first application are updated in real time, a notification scenario may be set based on an actual requirement, so that an application scope of the method provided in the first aspect can be expanded.

With reference to the first aspect, in some embodiments, different applications may correspond to different notification scenarios. In this way, a notification scenario may be customized based on different applications.

With reference to the first aspect, in some embodiments, the first message includes an advertising packet. In other words, the first device sends the first message in an advertising manner. In some embodiments, the advertising packet includes an advertising data part, the advertising data part includes a first field and a second field, the first field is used to carry the identifier of the first application, and the second field is used to carry the identifier of the first scenario.

With reference to the first aspect, in some embodiments, before the first device identifies the first scenario, the first device may further detect a first operation, and enable a short-range notification function in response to the first operation. The short-range notification function is used by the first device to identify the first scenario and send the first message. An implementation form of the first operation is not limited in this embodiment of this application.

With reference to the first aspect, in some embodiments, before the second device determines the first application and the first scenario based on the first message, the second device may further detect a second operation, and enable a short-range notification function in response to the second operation, where the short-range notification function is used by the second device to determine the first application and the first scenario based on the first message. An implementation form of the second operation is not limited in this embodiment of this application.

With reference to the first aspect, in some embodiments, the prompt information output by the second device may include any one or more of the following: an interface element displayed on a display, audio played by an audio module, a vibration prompt generated by a motor, or a flashing prompt of a flash.

With reference to the first aspect, in some embodiments, after receiving a short-range message, when the second device receives, again within a preset time period, another short-range message that indicates a notification scenario the same as that indicated by the short-range message, the second device no longer outputs prompt information based on the another short-range message. Specifically, the second device may further receive a second message by using the short-range wireless communication technology within a preset time period after receiving the first message, where the second message carries the identifier of the first application and the identifier of the first scenario; and the second device determines the first application and the first scenario based on the second message. In this case, the prompt information output by the second device is only used to indicate the first application and indicate the first scenario once. Herein, the second message may be sent by the first device, or may be sent by another device. This is not limited in this embodiment of this application. In this way, frequency of outputting same prompt information by the second device may be reduced, so that a user can be prompted more concisely and conveniently and have better user experience.

With reference to the first aspect, in some embodiments, the second device may periodically output prompt information. The following lists two possible implementations.

In an implementation, the second device may collect statistics on short-range messages that are sent by another electronic device based on the first application and that are received within a first preset periodicity, where the short-range messages each indicate a notification scenario. In addition, the second device outputs prompt information once every first preset periodicity. The prompt information is used to indicate the first application and notification scenarios indicated by the short-range messages that are obtained through statistics collection within the first preset periodicity. Specifically, before outputting the prompt information, the second device may further receive a third message by using the short-range wireless communication technology, where the third message carries the identifier of the first application and the identifier of the first scenario. The first message and the third message are received by the second device within the first preset periodicity, and the second device determines the first application and the first scenario based on the third message. In this case, the prompt information output by the second device is specifically used to indicate the first application and indicate the first scenario twice. In this way, frequency of outputting same prompt information by the second device may be reduced, so that a user can be prompted more concisely and conveniently, and have better user experience.

In another implementation, before outputting the prompt information, the second device may further receive a fourth message by using the short-range wireless communication technology, where the fourth message carries the identifier of the first application and an identifier of a second scenario. The first message and the fourth message are received by the second device within a second preset periodicity, and the second device determines the first application and the second scenario based on the fourth message. In this case, the prompt information output by the second device is further used to indicate the second scenario once. In this way, a plurality of pieces of prompt information may be integrated together, and frequency of outputting prompt information by the second device may be reduced, so that a user can be prompted more concisely and conveniently and have better user experience.

According to a second aspect, an embodiment of this application provides an application-based short-range notification method that is applied to a first device. The method includes: the first device runs a first application and identifies a first scenario; and the first device sends a first message to a second device by using a short-range wireless communication technology, where the first message carries an identifier of the first application and an identifier of the first scenario, so that the second device outputs prompt information based on the first message to indicate the first application and the first scenario, where the first application is installed on both the first device and the second device.

When implementing the method provided in the second aspect, the first device may be independent of the Internet, and send a short-range message by using only the short-range wireless communication technology. In this method, an additional server needs to be configured, so that costs of short-range notification are reduced. In addition, a short-range message transmitted between electronic devices carries only an identifier of an application and an identifier of a notification scenario, so that disclosure of privacy data such as personal location information and a personal account of a user can be avoided.

With reference to the second aspect, in some embodiments, the short-range wireless communication technology may include but is not limited to BT, NFC, a WLAN (for example, Wi-Fi), ZigBee, UWB, or the like.

With reference to the second aspect, in this embodiment of this application, the first device stores one or more notification scenarios corresponding to the first application and an identifier corresponding to each notification scenario, where the one or more notification scenarios include the first scenario. In this way, it can be ensured that the first device can identify the first scenario and send the first message.

With reference to the second aspect, in some embodiments, the one or more notification scenarios corresponding to the first application may be preset, or may be updated in real time. When the one or more notification scenarios corresponding to the first application are updated in real time, a notification scenario may be set based on an actual requirement, so that an application scope of the method provided in the second aspect can be expanded.

With reference to the second aspect, in some embodiments, different applications may correspond to different notification scenarios. In this way, a notification scenario may be customized based on different applications.

With reference to the second aspect, in some embodiments, the first message includes an advertising packet. In other words, the first device sends the first message in an advertising manner. In some embodiments, the advertising packet includes an advertising data part, the advertising data part includes a first field and a second field, the first field is used to carry the identifier of the first application, and the second field is used to carry the identifier of the first scenario.

With reference to the second aspect, in some embodiments, before the first device identifies the first scenario, the first device may further detect a first operation, and enable a short-range notification function in response to the first operation. The short-range notification function is used by the first device to identify the first scenario and send the first message. An implementation form of the first operation is not limited in this embodiment of this application.

According to a third aspect, an embodiment of this application provides an application-based short-range notification method, where the method is applied to a second device. The method includes: the second device receives, by using a short-range wireless communication technology, a first message sent by a first device, where the first message carries an identifier of a first application and an identifier of a first scenario; the second device determines the first application and the first scenario based on the first message; and the second device outputs prompt information, where the prompt information is used to indicate the first application and the first scenario, and the first application is installed on both the first device and the second device.

When implementing the method provided in the third aspect, the second device may be independent of the Internet, and receive a short-range message by using only the short-range wireless communication technology. The method is directly performed between electronic devices, and no additional server needs to be configured, so that costs of short-range notification are reduced. In addition, a short-range message transmitted between electronic devices carries only an identifier of an application and an identifier of a notification scenario, so that disclosure of privacy data such as personal location information and a personal account of a user can be avoided.

With reference to the third aspect, in some embodiments, the short-range wireless communication technology may include but is not limited to BT, NFC, a WLAN (for example, Wi-Fi), ZigBee, UWB, or the like.

With reference to the third aspect, in this embodiment of this application, the second device stores one or more notification scenarios corresponding to the first application and an identifier corresponding to each notification scenario, where the one or more notification scenarios include the first scenario. In this way, it can be ensured that the second device can parse the first message.

With reference to the third aspect, in some embodiments, the one or more notification scenarios corresponding to the first application may be preset, or may be updated in real time. When the one or more notification scenarios corresponding to the first application are updated in real time, a notification scenario may be set based on an actual requirement, so that an application scope of the method provided in the third aspect can be expanded.

With reference to the third aspect, in some embodiments, different applications may correspond to different notification scenarios. In this way, a notification scenario may be customized based on different applications.

With reference to the third aspect, in some embodiments, the first message includes an advertising packet. In other words, the second device receives the first message by scanning the advertising packet. In some embodiments, the advertising packet includes an advertising data part, the advertising data part includes a first field and a second field, the first field is used to carry the identifier of the first application, and the second field is used to carry the identifier of the first scenario.

With reference to the third aspect, in some embodiments, before the second device determines the first application and the first scenario based on the first message, the second device may further detect a second operation, and enable a short-range notification function in response to the second operation, where the short-range notification function is used by the second device to determine the first application and the first scenario based on the first message. An implementation form of the second operation is not limited in this embodiment of this application.

With reference to the third aspect, in some embodiments, the prompt information output by the second device may include any one or more of the following: an interface element displayed on a display, audio played by an audio module, a vibration prompt generated by a motor, or a flashing prompt of a flash.

With reference to the third aspect, in some embodiments, after receiving a short-range message, when another short-range message is received within a preset time period and the another short-range message and the short-range message indicate a same notification scenario, the second device no longer outputs prompt information based on the another short-range message. Specifically, the second device may further receive a second message by using the short-range wireless communication technology within a preset time period after receiving the first message, where the second message carries the identifier of the first application and the identifier of the first scenario; and the second device determines the first application and the first scenario based on the second message. In this case, the prompt information output by the second device is specifically used to indicate the first application and indicate the first scenario once. Herein, the second message may be sent by the first device, or may be sent by another device. This is not limited in this embodiment of this application. In this way, frequency of outputting same prompt information by the second device may be reduced, so that a user can be prompted more concisely and conveniently and have better user experience.

With reference to the third aspect, in some embodiments, the second device may periodically output prompt information. The following lists two possible implementations.

In an implementation, the second device may collect statistics on short-range messages that are sent by another electronic device based on the first application and that are received within a first preset periodicity, where the short-range messages each indicate a notification scenario. In addition, the second device outputs prompt information once every first preset periodicity. The prompt information is used to indicate the first application and notification scenarios indicated by the short-range messages that are obtained through statistics collection within the first preset periodicity. Specifically, before outputting the prompt information, the second device may further receive a third message by using the short-range wireless communication technology, where the third message carries the identifier of the first application and the identifier of the first scenario. The first message and the third message are received by the second device within the first preset periodicity, and the second device determines the first application and the first scenario based on the third message. In this case, the prompt information output by the second device is specifically used to indicate the first application and indicate the first scenario twice. In this way, frequency of outputting same prompt information by the second device may be reduced, so that a user can be prompted more concisely and conveniently and have better user experience.

In another implementation, before outputting the prompt information, the second device may further receive a fourth message by using the short-range wireless communication technology, where the fourth message carries the identifier of the first application and the identifier of the second scenario. The first message and the fourth message are received by the second device within a second preset periodicity, and the second device determines the first application and the second scenario based on the fourth message. In this case, the prompt information output by the second device is further used to indicate the second scenario once. In this way, a plurality of pieces of prompt information may be integrated together, and frequency of outputting prompt information by the second device may be reduced, so that a user can be prompted more concisely and conveniently and have better user experience.

According to a fourth aspect, an embodiment of this application provides an electronic device, where the electronic device includes a display, a memory, and one or more processors. The display and the memory are coupled to the one or more processors, the memory is configured to store computer program code, the computer program code includes computer instructions, and the one or more processors invoke the computer instructions to enable the electronic device to perform the method according to the second aspect or any possible implementation of the second aspect.

According to a fifth aspect, an embodiment of this application provides an electronic device, where the electronic device includes a display, a memory, and one or more processors. The display and the memory are coupled to the one or more processors, the memory is configured to store computer program code, the computer program code includes computer instructions, and the one or more processors invoke the computer instructions to enable the electronic device to perform the method according to the third aspect or any possible implementation of the third aspect.

According to a sixth aspect, an embodiment of this application provides a communication system. The communication system includes a first device and a second device. A first application is installed on both the first device and the second device, the first device may be the electronic device according to the fourth aspect, and the second device may be the electronic device according to the fifth aspect.

According to a seventh aspect, an embodiment of this application provides a computer program product including instructions. When the computer program product runs on an electronic device, the electronic device is enabled to perform the method according to the second aspect or any possible implementation of the second aspect.

According to an eighth aspect, an embodiment of this application provides a computer-readable storage medium including instructions. When the instructions are run on an electronic device, the electronic device is enabled to perform the method according to the second aspect or any possible implementation of the second aspect.

According to a ninth aspect, an embodiment of this application provides a computer program product including instructions. When the computer program product runs on an electronic device, the electronic device is enabled to perform the method according to the third aspect or any possible implementation of the third aspect.

According to a tenth aspect, an embodiment of this application provides a computer-readable storage medium including instructions. When the instructions are run on an electronic device, the electronic device is enabled to perform the method according to the third aspect or any possible implementation of the third aspect.

Implementation of the technical solutions provided in embodiments of this application may be independent of the Internet, and transmission of a short-range message can be completed by using only the short-range wireless communication technology. The method is directly performed between electronic devices, and no additional server needs to be configured, so that costs of short-range notification are reduced. In addition, a short-range message transmitted between electronic devices carries only an identifier of an application and an identifier of a notification scenario, so that disclosure of privacy data such as personal location information and a personal account of a user can be avoided.

DESCRIPTION OF EMBODIMENTS

The following clearly describes the technical solutions in embodiments of this application in detail with reference to the accompanying drawings. In descriptions of embodiments of this application, unless otherwise specified, "/" indicates "or". For example, AB may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

A term "user interface (user interface, UI)" in the following embodiments of this application is a medium interface for interaction and information exchange between an application or an operating system and a user, and implements conversion between an internal form of information and a form that can be accepted by the user. The user interface is source code written in a specific computer language such as Java or an extensible markup language (extensible markup language, XML). The interface source code is parsed and rendered on an electronic device, and finally presented as content that can be identified by the user. A common representation form of the user interface is a graphical user interface (graphical user interface, GUI). The graphical user interface refers to a user interface that is related to a computer operation and that is displayed in a graphical manner. The user interface may be a visual interface element such as a text, an icon, a button, a menu, a tab, a text box, a dialog box, a status bar, a navigation bar, or a Widget that is displayed on a display of the electronic device.

Figure 1:
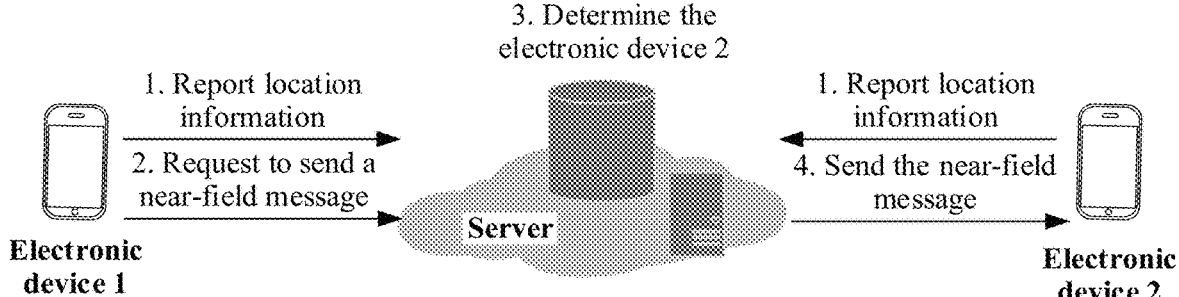
FIG. 1 is a schematic diagram of a short-range notification scenario in a current technology.

FIG. 1 shows an example of a current scenario in which a notification message is transmitted based on an application.

As shown in FIG. 1, a same APP is installed on both an electronic device 1 and an electronic device 2, and a server provides various services for the APP. There may be one or more servers. A process in which the electronic device 1 sends, based on the APP, a notification message to the nearby electronic device 2 includes the following steps:

1. The electronic device 1 and the electronic device 2 separately report location information to the server when running the APP.

2. The electronic device 1 sends, to the server based on the APP, a request for a notification message. Specific content of the notification message may be, for example, that the electronic device 1 purchases a service in the APP, or that the electronic device 1 uses a service provided by the APP.

3. The server receives the request for the notification message, and determines, based on the location information reported by each electronic device, that electronic devices near the electronic device 1 and on which the APP is installed include the electronic device 2.

4. The server responds to the request for the notification message, and sends the notification message to the electronic device 2.

5. The electronic device 2 receives the notification message.

In the notification message transmission manner shown in FIG. 1, communication between the electronic device and the server depends on the Internet such as a cellular network or a Wi-Fi network, and flexibility is poor. In this manner, an electronic device needs to report location information to a server, and a risk of disclosing user privacy exists. In addition, a corresponding server needs to be configured for each APP to complete transmission of a notification message. Therefore, costs are high.

The following embodiments of this application provide an application-based short-range notification method, an electronic device, and a system. In the method, in a process of running an application, when identifying a notification scenario corresponding to the application, the electronic device may send a short-range message to another nearby electronic device based on the application by using a short-range wireless communication technology. The short-range message carries an identifier of the application and an identifier of the notification scenario identified by the electronic device. Another nearby electronic device may receive the short-range message. An electronic device on which the application is installed may determine the application and the notification scenario based on the short-range message, and output prompt information, to notify a user of the notification scenario. In this way, short-range notification between electronic devices is completed. The method is independent of the Internet, and an electronic device does not need to report location information, so that the electronic device can send/receive a short-range message more flexibly, conveniently, and effectively, and disclosure of user privacy can be avoided.

In embodiments of this application, one application may correspond to one or more notification scenarios, and different applications correspond to different notification scenarios. For details, refer to detailed descriptions in subsequent method embodiments. Details are not described herein.

In the following embodiments of this application, the electronic device may send, in an advertising manner, a short-range message to another nearby electronic device by using the short-range wireless communication technology. The short-range wireless communication technology may include but is not limited to Bluetooth (Bluetooth), near field communication (near field communication, NFC), a wireless local area network (wireless local area networks, WLAN) (such as wireless fidelity (wireless fidelity, Wi-Fi)), ZigBee, ultra wideband (ultra wideband, UWB), or the like.

Each short-range wireless communication technology has a corresponding communication range, and the communication range is a signal coverage area when an electronic device sends a signal by using the short-range wireless communication technology. Different short-range wireless communication technologies may correspond to different communication ranges. For example, a communication range corresponding to Bluetooth may be within 10 meters, and a communication range corresponding to NFC may be within 20 centimeters. In the following embodiments of this application, the another electronic device near the electronic device refers to another electronic device within a communication range corresponding to the short-range wireless communication technology that is used by the electronic device.

A communication system provided in embodiments of this application is first described.

Figure 2:
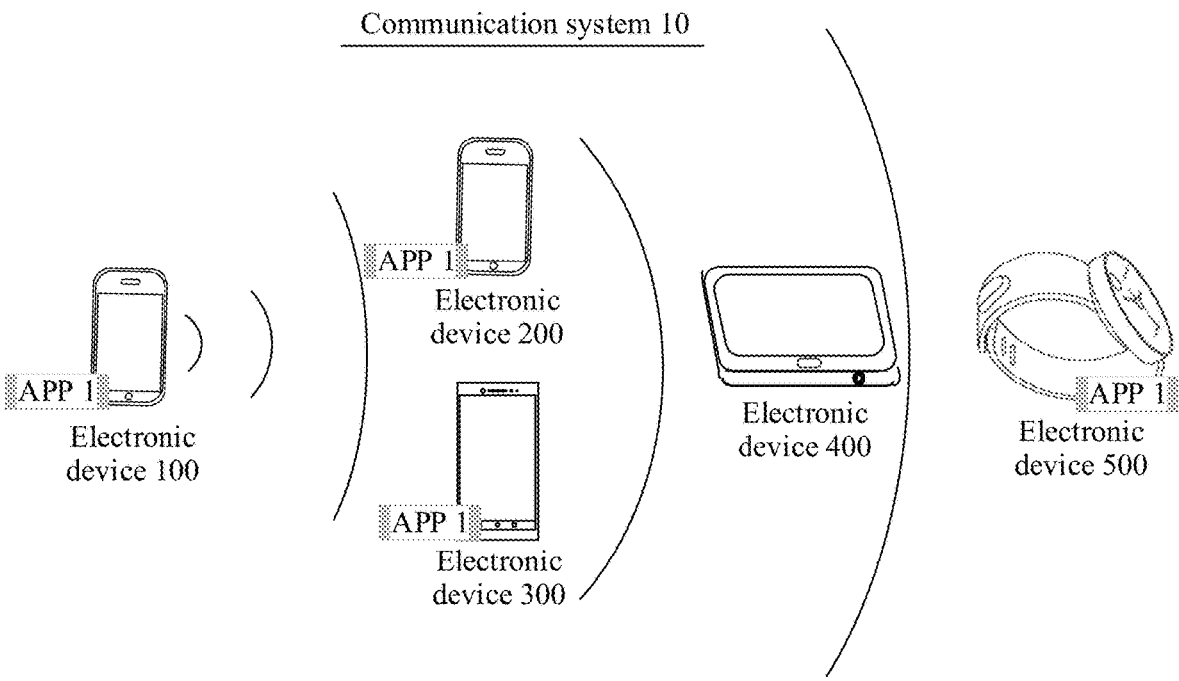
FIG. 2 shows a communication system according to an embodiment of this application.

FIG. 2 shows a communication system 10 according to an embodiment of this application. As shown in FIG. 2, the communication system 10 may include a plurality of electronic devices, for example, an electronic device 100, an electronic device 200, an electronic device 300, an electronic device 400, and an electronic device 500.

Each of the electronic devices 100 to 500 may be a portable terminal device carrying iOS, Android, Microsoft, or another operating system. For example, the portable terminal device may be a mobile phone, a tablet computer, or a wearable device. Alternatively, each of the electronic devices 100 to 500 may be a non-portable terminal device such as a laptop (Laptop) having a touch-sensitive surface or a touch panel, or a desktop computer having a touch-sensitive surface or a touch panel.

A plurality of APPs such as a game APP, an Internet access service APP (for example, SkyTone), and a payment APP (for example, Huawei Pay) may be installed in each of the electronic devices 100 to 500. SkyTone is an application that provides an overseas Internet access service, a hotel/air ticket reservation service, and a car rental service. Huawei Pay is an application that provides services such as mobile payment and fast travel.

When running an APP, each electronic device may generate a short-range message and send the short-range message by using a short-range wireless communication technology, that is, send the short-range message based on the APP. Each electronic device may also parse a received short-range message sent by another electronic device based on the APP.

The following embodiment is described by using an example in which an electronic device generates, sends, or receives a short-range message based on a first application (an APP 1 in FIG. 2). A type of the first application is not limited in this embodiment of this application. In the following embodiment, it is assumed that the first application is installed on each of the electronic device 100, the electronic device 200, the electronic device 300, and the electronic device 500. It is assumed that the electronic device 100 is a transmit end of a short-range message, and the electronic devices 200 to 400 are within a communication range corresponding to a short-range wireless communication technology that is used by the electronic device 100. A "short-range notification function" of the first application is enabled on each of the electronic device 100, the electronic device 200, and the electronic device 400. Herein, for a manner in which the "short-range notification function" of the first application is enabled on each electronic device and a specific meaning of the "short-range notification function", refer to related descriptions in subsequent method embodiments. Details are not described herein.

Each of the electronic devices 100 to 500 has one or more of a Bluetooth (BT) module, an NFC module, a WLAN module, and a ZigBee module.

When identifying a notification scenario, the electronic device 100 may send, in an advertising manner, a short-range message to another nearby electronic device by using the short-range wireless communications technology. Specifically, the electronic device 100 may send a short-range message by using one or more of the Bluetooth (BT) module, the NFC module, the WLAN module, and the ZigBee module.

The electronic device 200, the electronic device 300, and the electronic device 400 are located within the communication range corresponding to the short-range wireless communication technology that is used by the electronic device 100. Therefore, each of the electronic device 200, the electronic device 300, and the electronic device 400 may obtain, through scanning and by using one or more of the Bluetooth (BT) module, the NFC module, the WLAN module, and the ZigBee module, the short-range message sent by the electronic device 100.

After the electronic device 200, the electronic device 300, and the electronic device 400 obtain, through scanning, the short-range message sent by the electronic device 100 based on the first application, the electronic device 200 on which the first application is also installed and the electronic device 300 on which the first application is also installed may parse the short-range message. After parsing the short-range message, the electronic device 200 on which the "short-range notification function" of the first application is enabled may output prompt information to notify a user. It can be learned that the short-range notification provided in this embodiment of this application is performed between electronic devices that are located within a communication range of a short-range wireless communication technology and on which a same application is installed and a "short-range notification function" of the application is enabled.

Figure 3A:
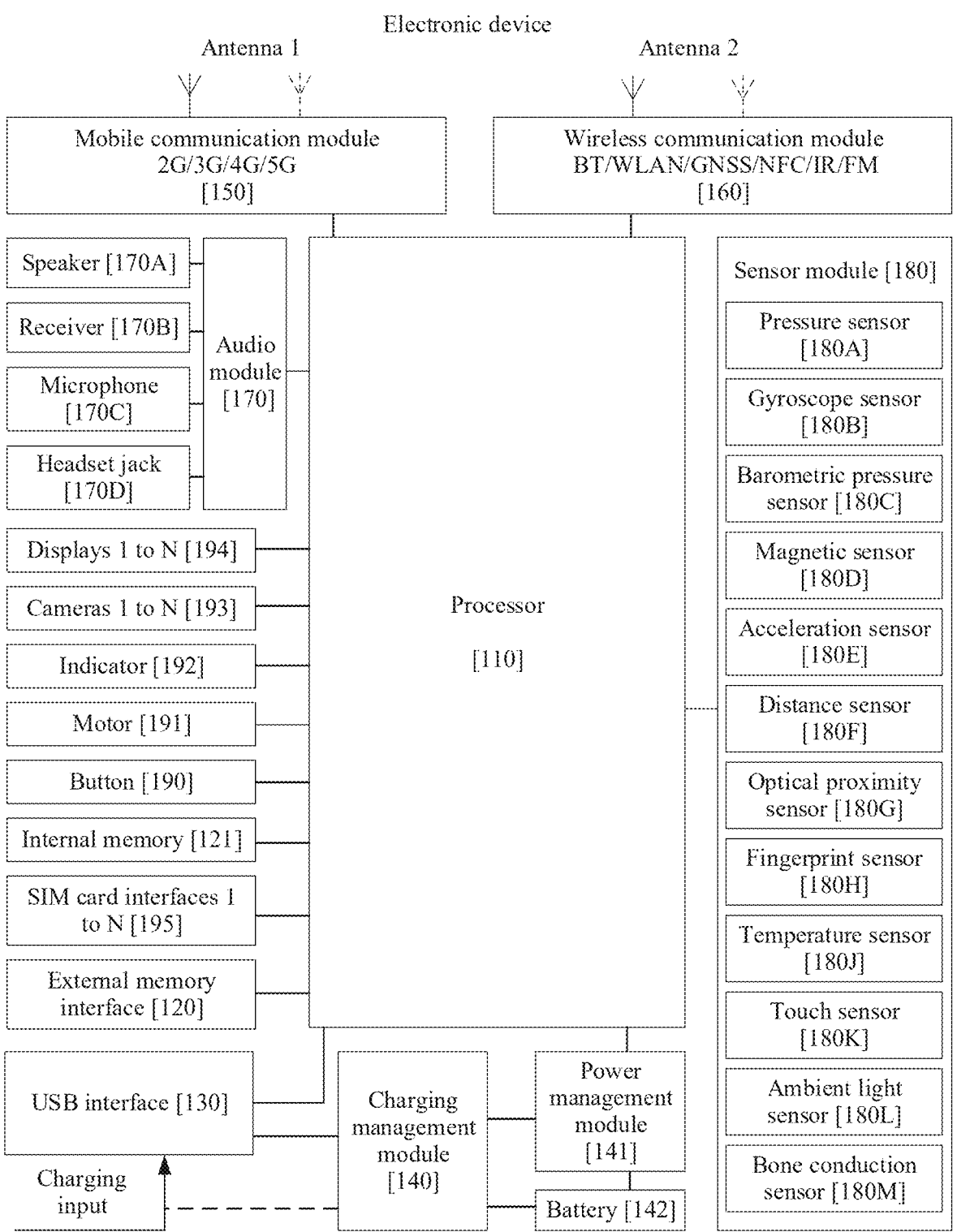
FIG. 3A is a schematic diagram of a hardware structure of an electronic device according to an embodiment of this application.

FIG. 3A is a schematic diagram of a structure of an electronic device according to an embodiment of this application. The electronic device may be any electronic device in the communication system 10 shown in FIG. 2.

As shown in FIG. 3A, the electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation on the electronic device. In other embodiments of this application, the electronic device may include more or fewer components than those shown in the figure, or combine some components, or split some components, or have a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and the like. Different processing units may be independent components, or may be integrated into one or more processors.

The controller may be a nerve center and a command center of the electronic device. The controller may generate an operation control signal based on an instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a solution that includes wireless communication such as 2G/3G/4G/5G and that is applied to the electronic device. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same component.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transfers the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communication module 150 or another functional module.

The wireless communication module 160 may provide a solution that is applied to the electronic device and that includes wireless communication such as a WLAN (for example, Wi-Fi), BT, a global navigation satellite system (global navigation satellite system, GNSS), frequency modulation (frequency modulation, FM), NFC, ZigBee, UWB, an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The Bluetooth (BT) module may provide a Bluetooth communication solution including one or more of classic Bluetooth (Bluetooth 2.1) or Bluetooth low energy (Bluetooth low energy, BLE). The WLAN module may provide a Wi-Fi communication solution.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. The wireless communication technology may include a global system for mobile communication (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, ZigBee, UWB, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

In some embodiments, when the electronic device shown in FIG. 3A is one end (for example, the electronic device 100) that sends a short-range message, the processor 110 may be configured to generate a short-range message when a notification scenario is identified in a process of running the first application. For specific content and a structure of the short-range message, refer to detailed descriptions in subsequent embodiments. Details are not described herein. The Bluetooth (BT) module, the NFC module, the WLAN module, and the ZigBee module that are included in the wireless communication module 160 may send the short-range message in an advertising manner.

In some other embodiments, when the electronic device shown in FIG. 3A is located within a communication range of the short-range wireless communication technology used by the electronic device 100 (for example, when the electronic device is the electronic device 200, the electronic device 300, or the electronic device 400 in the communication system 10 shown in FIG. 2), the Bluetooth (BT) module, the NFC module, the WLAN module, and the ZigBee module that are included in the wireless communication module 160 of the electronic device may obtain, through scanning, the short-range message sent by the electronic device 100. Further, when the first application is installed on the electronic device shown in FIG. 3A (for example, the electronic device is the electronic device 200 and the electronic device 300 in the communication system shown in FIG. 2), the processor 110 of the electronic device may be further configured to: parse a short-range message obtained through scanning, and determine an application based on which the short-range message is sent and specific content of the short-range message. Still further, when the "short-range notification function" of the first application is enabled on the electronic device (for example, the electronic device is the electronic device 200 in the communication system shown in FIG. 2), the processor 110 of the electronic device may generate prompt information based on specific content of a parsed short-range message, and indicate a related component to output the prompt information. For specific implementation of the prompt information, refer to detailed descriptions in subsequent method embodiments.

The electronic device implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diodes, QLED), or the like. In some embodiments, the electronic device may include one or N displays 194, where N is a positive integer greater than 1.

In some embodiments of this application, the display 194 may be configured to display the prompt information output by the electronic device after the electronic device receives the short-range message and parses the short-range message. For a specific manner of displaying the prompt information by the display 194, refer to related descriptions in subsequent method embodiments. Details are not described herein.

The internal memory 121 may be configured to store computer executable program code, where the executable program code includes instructions. The processor 110 runs the instructions stored in the internal memory 121, to perform various function applications and data processing of the electronic device. The internal memory 121 may include a program storage area and a data storage area.

The electronic device may implement audio functions by using the audio module 170, the speaker 170A, the receiver 170B, the microphone 170C, the headset jack 170D, the application processor, and the like. For example, a music playback function and a recording function are implemented.

The audio module 170 is configured to convert digital audio information into an analog audio signal output, and is also configured to convert an analog audio input into a digital audio signal. The audio module 170 may be further configured to: encode and decode an audio signal.

The speaker 170A, also referred to as a "loudspeaker", is configured to convert an audio electrical signal into a sound signal.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates that are made of conductive materials. When a force is applied to the pressure sensor 180A, capacitance between electrodes changes. The electronic device determines pressure intensity based on a capacitance change. When a touch operation is performed on the display 194, the electronic device detects intensity of the touch operation by using the pressure sensor 180A. The electronic device may also calculate a touch position based on a detection signal of the pressure sensor 180A. In some embodiments, touch operations that are performed at a same touch position but have different touch operation intensity may correspond to different operation instructions.

The touch sensor 180K is also referred to as a "touch panel". The touch sensor 180K may be disposed on the display 194. The touch sensor 180K and the display 194 constitute a touchscreen, and the touchscreen is also referred to as a "touch control screen". The touch sensor 180K is configured to detect a touch operation performed on or near the touch sensor. The touch sensor may transfer the detected touch operation to the application processor, to determine a type of a touch event. A visual output related to the touch operation may be provided by using the display 194. In some other embodiments, the touch sensor 180K may be alternatively disposed on a surface of the electronic device, and is located on a position different from that of the display 194.

The button 190 includes a power button, a volume button, and the like. The button 190 may be a mechanical button, or may be a touch button. The electronic device may receive a button input, and generate a button signal input related to user setting and function control of the electronic device.

The motor 191 may generate a vibration prompt. The motor 191 may be configured to provide an incoming call vibration prompt or a touch vibration feedback.

The indicator 192 may be an indicator light, and may be configured to indicate a charging status and a power change, or may be configured to indicate a message, a missed call, a notification, and the like.

A software system of the electronic device may use a layered architecture, an event-driven architecture, a micro-kernel architecture, a microservice architecture, or a cloud architecture.

Figure 3B:
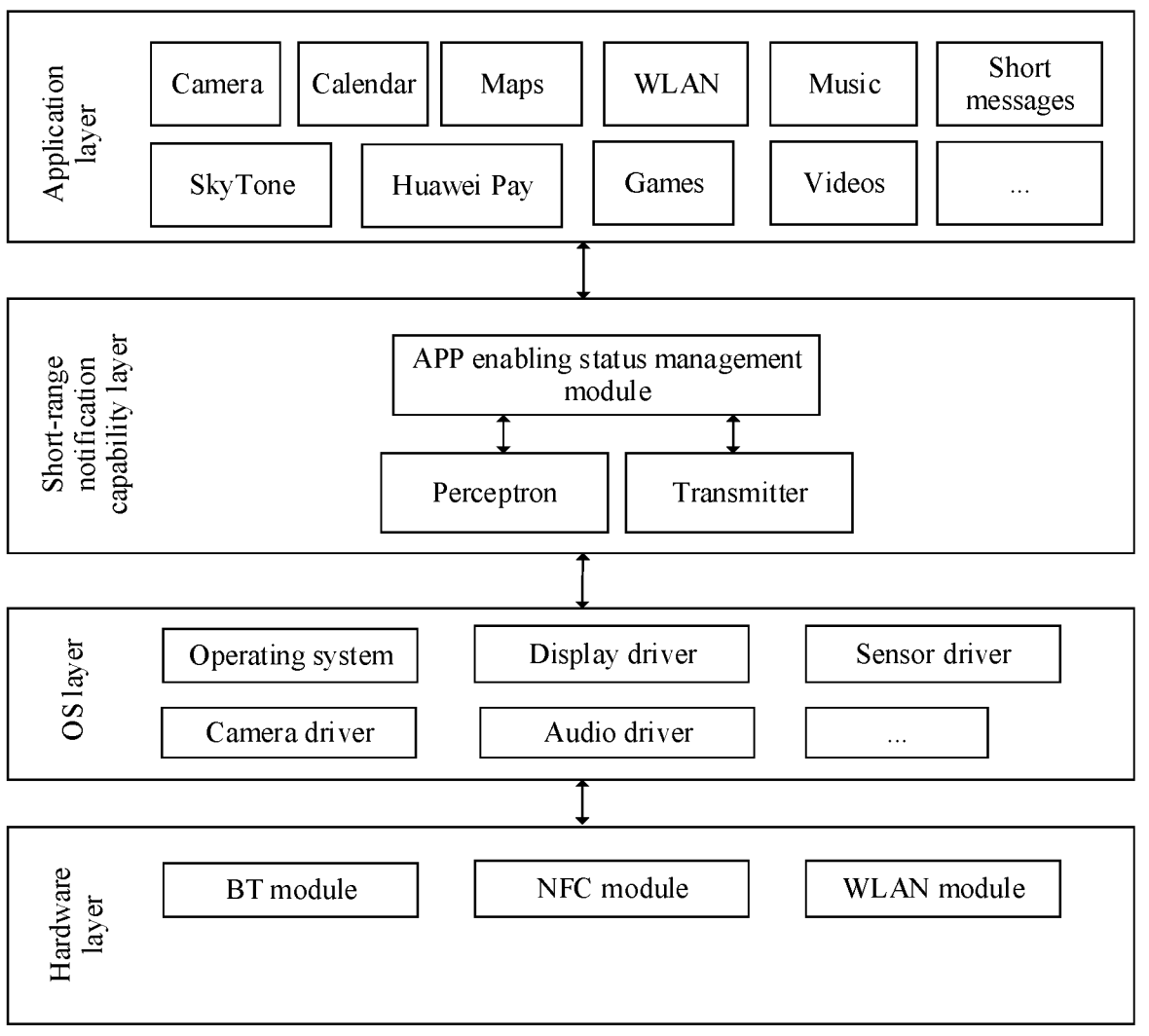
FIG. 3B is a schematic diagram of a software architecture of an electronic device according to an embodiment of this application.

FIG. 3B is a block diagram of a software structure of an electronic device according to an embodiment of this application.

In the layered architecture, software is divided into several layers, and each layer has a clear role and a clear task. The layers communicate with each other through a software interface. In some embodiments, the software system of the electronic device is divided into four layers: an application layer, a short-range notification capability layer, an operating system (operating system, OS) layer, and a hardware layer from top to bottom.

The application layer may include a series of application packages. As shown in FIG. 3B, the application packages may include applications such as Camera, Gallery, Calendar, Call, Maps, Navigation, WLAN, Bluetooth, Music, Videos, and Short messages, a game application package, and an Internet access service application package (for example, SkyTone), and a payment application package (for example, Huawei Pay). In a specific embodiment, the electronic device 100, the electronic device 200, and the electronic device 300 include a first application package.

In this embodiment of this application, the application package describes or predefines a notification scenario obtained when the electronic device runs a corresponding application, and an identifier corresponding to the notification scenario. In some embodiments, the electronic device may update the application package based on a resource obtained from a network, and may update a notification scenario and an identifier corresponding to the notification scenario. In other words, in this embodiment of this application, when the electronic device runs an application, notification scenarios corresponding to different time periods and identifiers corresponding to the notification scenarios may be different. Herein, for specific implementation of the notification scenario and the identifier corresponding to the notification scenario, refer to detailed descriptions in subsequent embodiments. Details are not described herein.

The OS layer includes an operating system and a driver. The OS layer provides an interface for the short-range notification capability layer to use each hardware of the hardware layer.

The hardware layer provides an underlying hardware capability of the electronic device, and may include one or more of a Bluetooth (BT) module, an NFC module, a WLAN module, and a ZigBee module.

The short-range notification capability layer is configured to provide a short-range notification function of the electronic device. The short-range notification capability layer provides short-range notification and perception services for all installed applications. Specifically, the short-range notification capability layer may include an APP enabling status management module, a transmitter, and a perceptron.

The APP enabling status management module is configured to manage a short-range notification function of each application installed on the electronic device, for example, record enabling/disabling of the short-range notification function of each application.

The perceptron is configured to cooperate with the OS layer and the hardware layer, to monitor a short-range message sent by another electronic device. Specifically, after obtaining, through scanning, the short-range message sent by the another electronic device, the Bluetooth (BT) module, the NFC module, the WLAN module, or the ZigBee module at the hardware layer transfers the short-range message to the perceptron through an interface at the OS layer. The perceptron parses the short-range message.

The transmitter is configured to cooperate with the OS layer and the hardware layer, to send a short-range message when a notification scenario is identified. Specifically, after identifying the notification scenario, a first application at the application layer sends an identifier of the identified notification scenario to the transmitter at the short-range notification capability layer. The transmitter generates a short-range message, and invokes an interface at the OS layer to send the generated short-range message to the hardware layer, and the generated short-range message is sent by the Bluetooth (BT) module, the NFC module, the WLAN module, or the ZigBee module at the hardware layer.

The following describes in detail an application-based short-range notification method provided in an embodiment of this application by using the short-range notification performed between the electronic device 100 and the electronic device 200 in the communication system 10 shown in FIG. 2 as an example.

Figure 4:
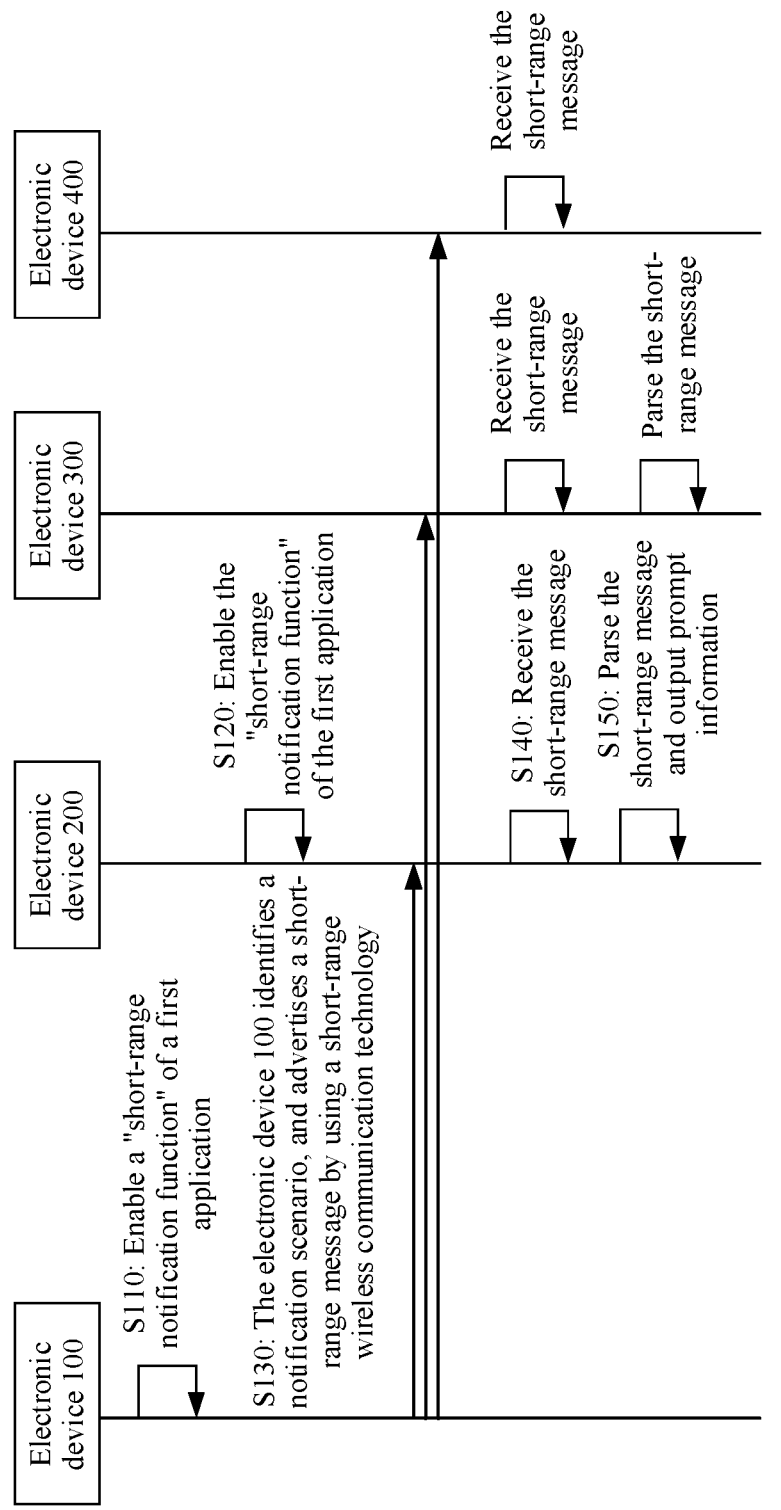
FIG. 4 is a schematic flowchart of an application-based short-range notification method according to an embodiment of this application.

FIG. 4 is a schematic flowchart of the application-based short-range notification method. In the method shown in FIG. 4, the first application is installed on an electronic device 100, an electronic device 200, and an electronic device 300. The electronic device 200, the electronic device 300, and an electronic device 400 are located within a short-range wireless communication range of the electronic device 100. A "short-range notification function" of the first application is enabled on the electronic device 100 and the electronic device 200. It should be noted that, because the electronic device 500 in the communication system shown in FIG. 2 is located outside the short-range wireless communication range, the electronic device 500 is not shown in the method shown in FIG. 4. In this embodiment of this application, the electronic device 100 sending a short-range message may alternatively be referred to as a first device. The electronic device 200 that receives and can parse the short-range message and can output prompt information based on the short-range message may alternatively be referred to as a second device.

As shown in FIG. 4, the method may include the following steps.

S110: The electronic device 100 enables the "short-range notification function" of the first application.

In this embodiment of this application, each electronic device may enable/disable a "short-range notification function" of each application. After enabling a "short-range notification function" of an application, when identifying a notification scenario in a process of running the application, the electronic device may send a short-range message to another nearby electronic device based on the application by using a short-range wireless communication technology. In addition, the electronic device may further receive a short-range message sent by another electronic device based on the application, and output prompt information based on the short-range message.

It may be understood that the "short-range notification function" is only a word used in this embodiment, and a meaning represented by the "short-range notification function" has been recorded in this embodiment. A name of the "short-range notification function" does not constitute any limitation on this embodiment. In addition, in some other embodiments of this application, the "short-range notification function" may alternatively be referred to as another noun such as a "short-range notification function".

The first application is one of a plurality of applications that are installed on the electronic device 100. The first application may be a game APP, an Internet access service APP (for example, SkyTone), a payment APP (for example, Huawei Pay), or an APP of another type. This is not limited in this embodiment of this application.

In some embodiments, the electronic device 100 may enable the "short-range notification function" of the first application in response to a received user operation. In this embodiment of this application, the user operation that is received by the electronic device 100 and that is used to enable the "short-range notification function" of the first application may be referred to as a first operation.

Figure 5A:
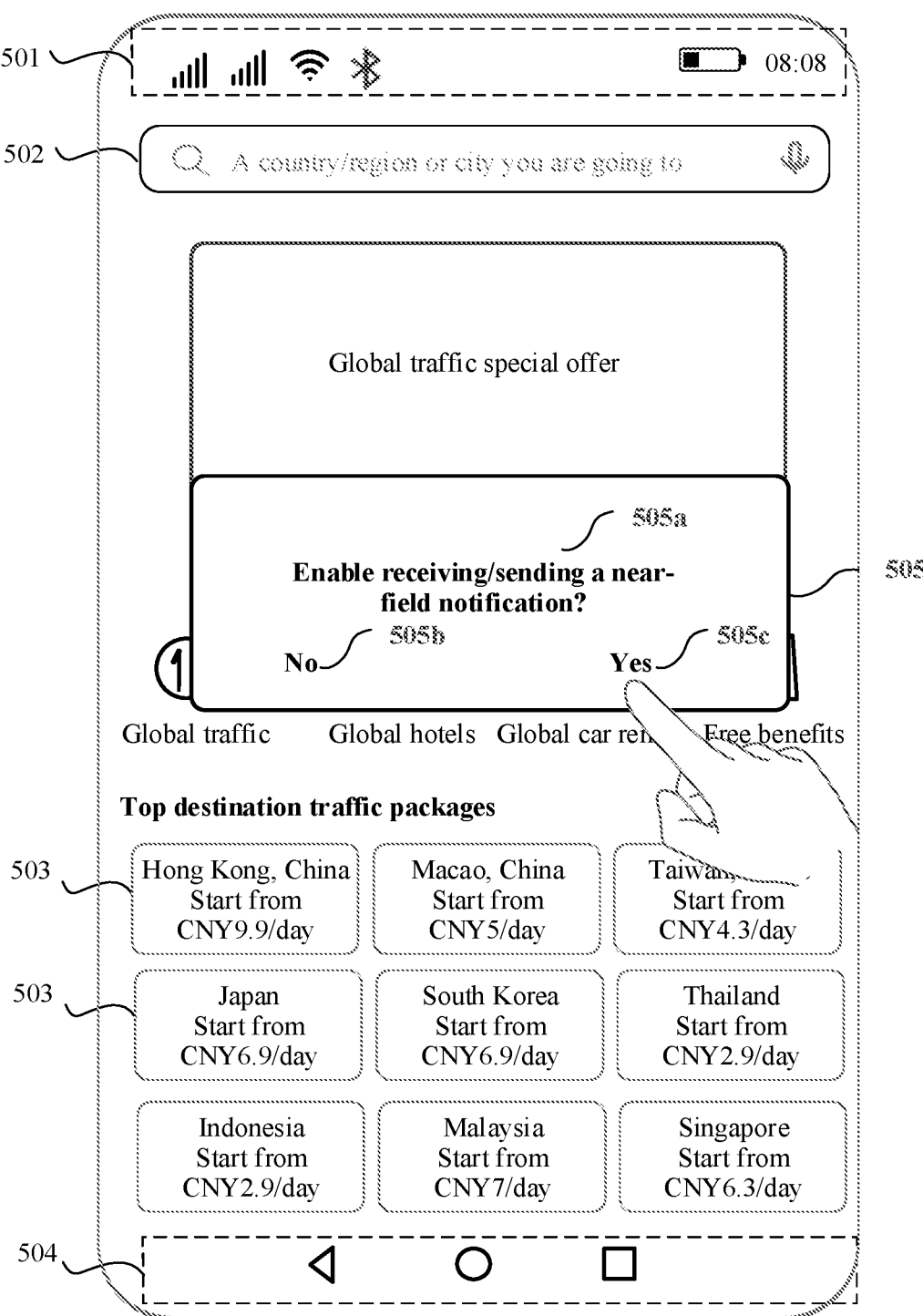
FIG. 5A and FIG. 5B show a group of user interfaces implemented on an electronic device 100 according to an embodiment of this application.

For example, FIG. 5A shows a user interface 51 provided when the electronic device 100 runs the first application. The user interface 51 may be an interface provided when the first application is run for the first time after the first application is installed on the electronic device 100. The user interface 51 may be an interface displayed in response to tapping, by a user, an icon of the first application on a home screen. In FIG. 5A, an example in which the first application is SkyTone is used.

As shown in FIG. 5A, the user interface 51 may include: a home page provided by SkyTone, and a window 505 displayed on top of the home page in a floating manner.

The home page provided by SkyTone includes: a status bar 501, a search box 502, a plurality of controls 503 for purchasing traffic, and a navigation bar 504. The status bar 501 may include: one or more signal strength indicators of a mobile communication signal (which may alternatively be referred to as a cellular signal), an operator name (for example, "China Mobile"), one or more signal strength indicators of a wireless fidelity (wireless fidelity, Wi-Fi) signal, a battery status indicator, a time indicator, and the like. The search box 502 may be used by the user to search for an area that the user wants to go to. The control 503 may be used to monitor a user operation, and the electronic device 100 may open, in response to the user operation, an interface for purchasing traffic in a region corresponding to the control. The navigation bar 504 may include system navigation buttons such as a "Back" button, a "Home screen" button, and a "Multitask" button.

The window 505 is displayed on top of remaining content in the user interface 51 in a floating manner. The window 505 is used by the user to enable/disable a "short-range notification function" of the first application. The window 505 includes: a prompt text 505a, a control 505b, and a control 505c. The prompt text 505a is used to inform the user of a function of the window 505. For example, the prompt text may be a text "Do you allow a short-range notification to be received/sent?". The control 505b is used to monitor a user operation (for example, a tap operation). The electronic device 100 may disable the "short-range notification function" of the first application in response to the user operation. The control 505c is used to monitor a user operation (for example, a tap operation). The electronic device 100 may enable the "short-range notification function" of the first application in response to the user operation.

In addition to a user operation (for example, the tap operation received on the control 505c) received on an interface provided when the electronic device 100 shown in FIG. 5A runs the first application for the first time, the electronic device 100 may further enable the "short-range notification function" of the first application in response to another user operation. For example, the electronic device 100 may further provide, in an internal function setting interface of the first application, a control used to enable/disable the "short-range notification function" of the first application. The user may enable the "short-range notification function" of the first application by inputting a user operation (for example, a tap operation) on the control. For another example, the electronic device 100 may further display a setting interface provided by a settings (settings) application. The setting interface may include a control that is provided for the user and that is used to enable/disable the "short-range notification function" of the first application. The user may enable the "short-range notification function" of the first application by inputting a user operation on the control. For another example, the user may further enable the "short-range notification function" of the first application by using an operation input on a physical button, a voice instruction, or the like.

In some other embodiments, the electronic device 100 may further enable the "short-range notification function" of the first application by default, and a user operation is not required.

S120: The electronic device 200 enables the "short-range notification function" of the first application.

A specific implementation in which the electronic device 200 enables the "short-range notification function" of the first application is the same as the specific implementation in which the electronic device 100 enables the "short-range notification function" of the first application. For details, refer to the detailed descriptions of step S110. Details are not described herein again. In this embodiment of this application, a user operation that is received by the electronic device 200 and that is used to enable the "short-range notification function" of the first application may be referred to as a second operation.

S130: The electronic device 100 runs the first application, and advertises a short-range message by using the short-range wireless communication technology when identifying a notification scenario of the first application, where the short-range message is used to indicate the first application and the notification scenario.

In this embodiment of this application, different applications may correspond to different notification scenarios. One application may correspond to one or more notification scenarios. Each scenario may correspond to a scenario identifier, and the notification scenario identifier is used to indicate the notification scenario. A notification scenario corresponding to an application and an identifier corresponding to each scenario may be predefined by a developer of the application, and stored in an installation package of the application. In some embodiments, an electronic device may further update the application package based on a resource obtained from a network, and may update a notification scenario and an identifier corresponding to the notification scenario. A quantity of notification scenarios corresponding to an application is not limited in this embodiment of this application. In some embodiments, the quantity may be customized by the developer.

After an application is installed on an electronic device, or after an electronic device updates a version of an application, the electronic device may learn a notification scenario corresponding to the application and an identifier corresponding to each scenario. All electronic devices on which a same application is installed may learn a notification scenario corresponding to the application and an identifier corresponding to each scenario. For example, both the electronic device 100 and the electronic device 200 may learn a notification scenario corresponding to the first application and an identifier corresponding to each scenario. In the following embodiment, an identifier corresponding to a notification scenario may alternatively be referred to as a channel name (channel name).

For example, Table 1 shows examples of notification scenarios respectively corresponding to several applications that are installed in the electronic device 100 and identifiers corresponding to the scenarios. Each application also has a corresponding identifier (APP ID), and the identifier is used to indicate the application function program.

TABLE 1

| Application | APP ID | Notification scenario | Scenario identifier |
|---|---|---|---|
| SkyTone | 1 | Purchasing a traffic package | Ch_1 |
| | | Purchasing an air ticket | Ch_2 |
| Huawei Pay | 2 | Paying with a discount | Ch_1 |
| | | Subscribing to a membership card | Ch_2 |
| | | Drawing lots | Ch_3 |
| Game application | 3 | Starting a game | Ch_1 |

In this embodiment of this application, in a process of running the first application, when identifying a notification scenario corresponding to the first application, the electronic device 100 may advertise a short-range message by using the short-range wireless communication technology. The first application may be run in the foreground of the electronic device 100, or may be run in the background of the electronic device 100.

For example, when the first application is SkyTone, the electronic device 100 may advertise, when identifying that a user purchases a traffic package or purchases an air ticket by using SkyTone, a short-range message by using the short-range wireless communication technology. When the first application is Huawei Pay, the electronic device 100 may advertise, when identifying that the user subscribes to a membership card, draws lots, or pays with a discount by using Huawei Pay, a short-range message by using the short-range wireless communication technology. When the first application is Huawei Pay, the electronic device 100 may advertise, when enabling a game, a short-range message by using the short-range wireless communication technology.

Specifically, the electronic device 100 sends, in an advertising manner, a short-range message by using the short-range wireless communication technology. The short-range wireless communication technology used by the electronic device 100 may include but is not limited to Bluetooth (BT), NFC, Wi-Fi, ZigBee, UWB, or the like. The short-range message carries an identifier of the first application and an identifier of a notification scenario currently identified by the electronic device 100.

In other words, an implementation form of the short-range message in this embodiment of this application is an advertising package or an advertising packet that is sent by the electronic device 100 by using the short-range wireless communication technology. In this embodiment of this application, a packet format of an original Bluetooth advertising package, an NFC advertising package, a Wi-Fi advertising package, a ZigBee advertising package, or a UWB advertising package is not changed, and only content in an advertising data (advertising data, AD) segment/part of the original advertising package is updated. Remaining parts of the Bluetooth advertising package, the NFC advertising package, the Wi-Fi advertising package, the ZigBee advertising package, and the UWB advertising package in this embodiment of this application, such as a preamble, an access address, a header, a length, and a check, are the same as those in a current technology. Detailed descriptions are not provided herein. In this embodiment of this application, the advertising data (AD) segment/part carries the identifier of the first application and an identifier of a notification scenario identified by the electronic device 100.

Figure 6A:
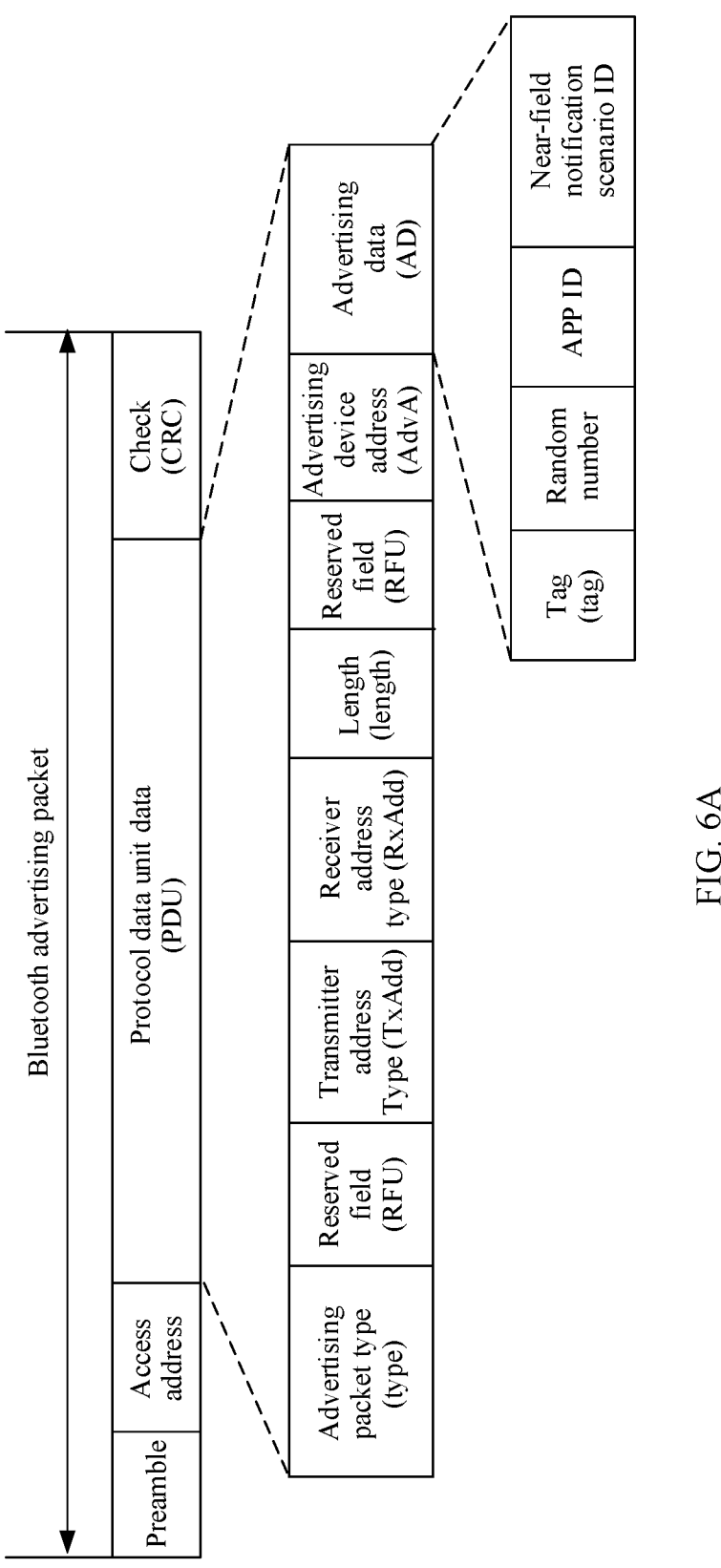
FIG. 6A and FIG. 6B are a schematic diagram of a format of a short-range message according to an embodiment of this application.

FIG. 6A shows an example of a packet structure of a Bluetooth advertising package according to an embodiment of this application.

As shown in FIG. 6A, a Bluetooth advertising packet includes the following parts: a preamble (preamble), an access address (access address), a protocol data unit (protocol data unit, PDU), and a cyclic redundancy check (cyclic redundancy check, CRC). The PDU may include the following parts: an advertising packet type, a reserved field, a transmitter address type, a receiver address type, a length field, a reserved field, an advertising device address, and advertising data (AD). A value of the advertising packet type may be a general advertising indication (ADV_IND), and indicate that the Bluetooth advertising packet shown in FIG. 6A is of a general advertising type.

As shown in FIG. 6A, the advertising data (AD) includes a first field and a second field. The first field is used to carry an identifier (APP ID) of a first application, and the second field is used to carry an identifier of a notification scenario identified by an electronic device 100. In some embodiments, the advertising data (AD) may further include a random number generated by the electronic device 100. The electronic device 100 may generate different random numbers at different time, and use a short-range message that is sent in a corresponding time period to carry the random number. In this way, when obtaining, through scanning, the short-range message sent by the electronic device 100, the electronic device 100 may determine, via the random number, that the short-range message is the short-range message sent by the electronic device 100. Therefore, the electronic device 100 does not process the short-range message.

As shown in FIG. 6A, in some embodiments, the advertising data (AD) may further include a tag (tag), and the tag may be used to indicate a structure of the advertising data (AD).

It may be understood that a length of the advertising data (AD) in the Bluetooth advertising package shown in FIG. 6A is 31 bytes (byte). A length occupied by each part of the advertising data (AD) is not specifically limited in this embodiment of this application. All parts of the advertising data (AD) may occupy all 31 bytes, or may occupy only some bytes in the 31 bytes, and the remaining bytes are supplemented with 0. For example, in a specific example, the tag (tag), the random number, the APP ID, and the notification scenario identifier that are in the advertising data (AD) may respectively occupy 6 bytes, 8 bytes, 16 bytes, and 1 byte.

Figure 5B:
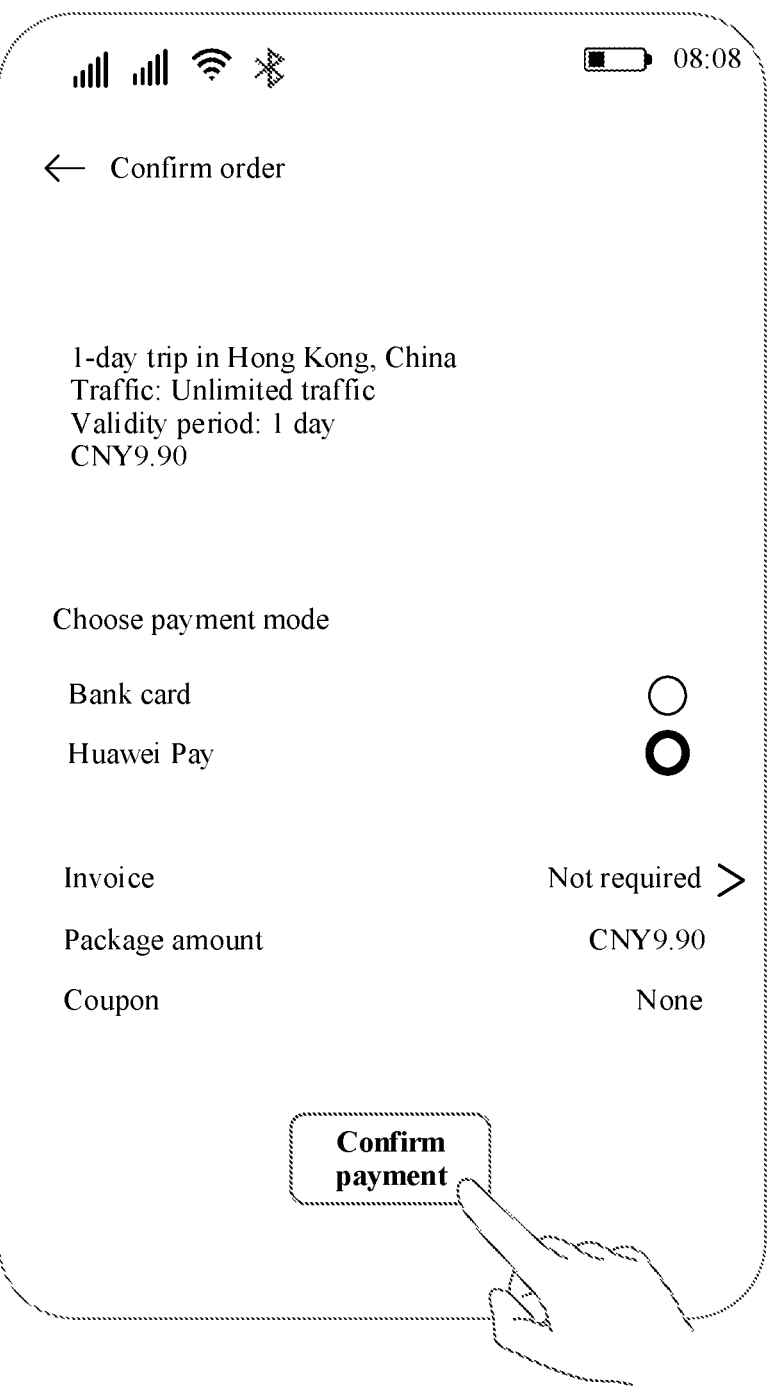

For example, FIG. 5B shows an example of a user interface 52 displayed on the electronic device 100 when a user purchases a traffic package on the electronic device 100 by using SkyTone. The user interface 52 may be an interface displayed when the user purchases, after the user taps the control 503 in the user interface 51 shown in FIG. 5A, traffic on a user interface displayed by the electronic device 100.

Figure 6B:
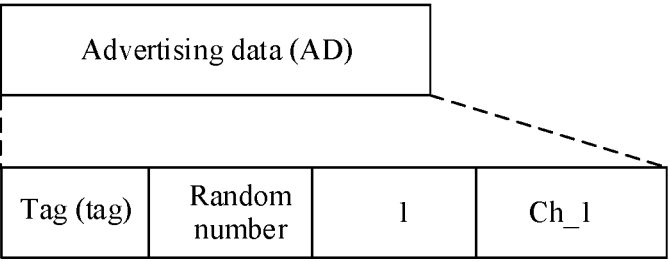

After the user successfully purchases a traffic package (for example, the user taps a control "Confirm to pay" shown in FIG. 5B and successfully pays) on the electronic device 100, the electronic device 100 identifies a notification scenario of purchasing the traffic package. Then, the electronic device 100 may advertise a short-range message by using a short-range wireless communication technology. The short-range message carries an identifier "1" of "SkyTone" and an identifier "Ch_1" of the notification scenario of purchasing the traffic package. For example, FIG. 6B shows advertising data (AD) in a Bluetooth advertising packet sent by the electronic device 100 when the electronic device 100 sends a short-range message by using Bluetooth. As shown in FIG. 6B, the advertising data (AD) carries a tag (tag), a random number, the identifier "1" of "SkyTone", and the identifier "Ch_1" of the notification scenario of purchasing the traffic package.

In some embodiments, before sending a short-range message, the electronic device 100 may further encrypt, by using a security encryption algorithm, an identifier of the first application and an identifier of a notification scenario identified by the electronic device 100 that are carried in the short-range message, to prevent the identifier of the first application and the identifier of the notification scenario that are carried in the short-range message from being exposed, maliciously intercepted, or tampered with. The security encryption algorithm is not limited in this embodiment of this application. For example, the security encryption algorithm may be an advanced encryption standard (advanced encryption standard, AES) in a symmetric encryption algorithm.

In this embodiment of this application, the notification scenario identified by the electronic device 100 when the electronic device 100 runs the first application may be referred to as a first scenario. The short-range message sent by the electronic device 100 after the electronic device 100 identifies the notification scenario may be referred to as a first message.

S140: The electronic device 200 scans or receives the short-range message sent by the electronic device 100.

Specifically, each electronic device may monitor, by using one or more of the Bluetooth (BT) module, the NFC module, the WLAN module, and the ZigBee module, a signal transmitted by another device, for example, an advertising package.

In the communication system shown in FIG. 2, the electronic device 200, the electronic device 300, and the electronic device 400 are located within the communication range of the short-range wireless communication technology used by the electronic device 100. Therefore, each of the electronic device 200, the electronic device 300, and the electronic device 400 may scan or receive, by using one or more short-range wireless communication technologies of Bluetooth (BT), NFC, a WLAN, ZigBee, or UWB, the short-range message sent by the electronic device 100. After receiving the short-range message, a short-range wireless communication module may transfer the short-range message to a short-range notification capability layer for parsing.

S150: The electronic device 200 determines the first application and the notification scenario based on the received short-range message, and outputs prompt information, where the prompt information is used to indicate the first application and the notification scenario.

In this embodiment of this application, an electronic device on which the first application is installed stores a notification scenario corresponding to the first application and an identifier corresponding to each scenario. Therefore, only an electronic device on which the first application is installed can parse a received short-range message based on the prestored notification scenario corresponding to the first application and the identifier corresponding to each scenario, to determine the first application and the notification scenario that are indicated by the short-range message. In other words, the electronic device 200 on which the first application is installed and the electronic device 300 on which the first application is installed can successfully parse the received short-range message.

Specifically, each of the electronic device 200, the electronic device 300, and the electronic device 400 that receive the short-range message may obtain, based on packet formats of the foregoing Bluetooth advertising package, the NFC advertising package, the Wi-Fi advertising package, the ZigBee advertising package, and the UWB advertising package, the identifier of the application and the identifier of the notification scenario that are carried in the advertising data (AD) segment/part in the short-range message. Then, both the electronic device 200 and the electronic device 300 may determine, based on the identifier of the application, that the short-range message is sent based on the first application, and may further determine, based on the identifier of the notification scenario, a notification scenario indicated by the short-range message. The first application is not installed on the electronic device 400, and the electronic device 400 does not store the notification scenario corresponding to the first application and the identifier corresponding to each scenario. Therefore, the electronic device 400 cannot parse an application indicated by the identifier of the application and a notification scenario indicated by the identifier of the notification scenario, where the identifier of the application and the identifier of the notification scenario are carried in the short-range message.

In a specific example, when the electronic device 100 sends the short-range message shown in FIG. 6B, the electronic device 200 and the electronic device 300 may parse the short-range message. In addition, the electronic device 200 and the electronic device 300 may learn, based on the value "1" of the APP ID in the short-range message, that the short-range message is sent based on "SkyTone", and learn, based on the identifier "Ch_1" of the notification scenario in the short-range message, that a corresponding notification scenario is purchasing the traffic package.

After parsing the short-range message, the electronic device on which the "short-range notification function" of the first application is enabled may output prompt information. In other words, although both the electronic device 200 and the electronic device 300 may parse the received short-range message, only the electronic device 200 on which the "short-range notification function" of the first application is enabled outputs prompt information based on the short-range message. The prompt information is used to prompt the first application and the notification scenario that are indicated by the short-range message. The prompt information may include any one or a combination of the following: an interface element displayed on a display, audio played by an audio module, a vibration prompt generated by a motor, a flashing prompt of a flash, and the like. A form of the prompt information may be autonomously set by a user, or may be predefined by an installation package of the first application.

In some embodiments of this application, the electronic device 200 may output prompt information in a process of running the first application, or may output prompt information when the first application is not run. This is not limited in this embodiment of this application. When the electronic device 200 outputs prompt information in a process of running the first application, the first application may be run in the foreground of the electronic device 200, or may be run in the background of the electronic device 200.

In some embodiments, the electronic device 200 may immediately output prompt information after receiving a short-range message each time. Herein, the prompt information may be displayed on a user interface that is currently displayed after the electronic device 200 receives and parses the short-range message.

Figure 7A:
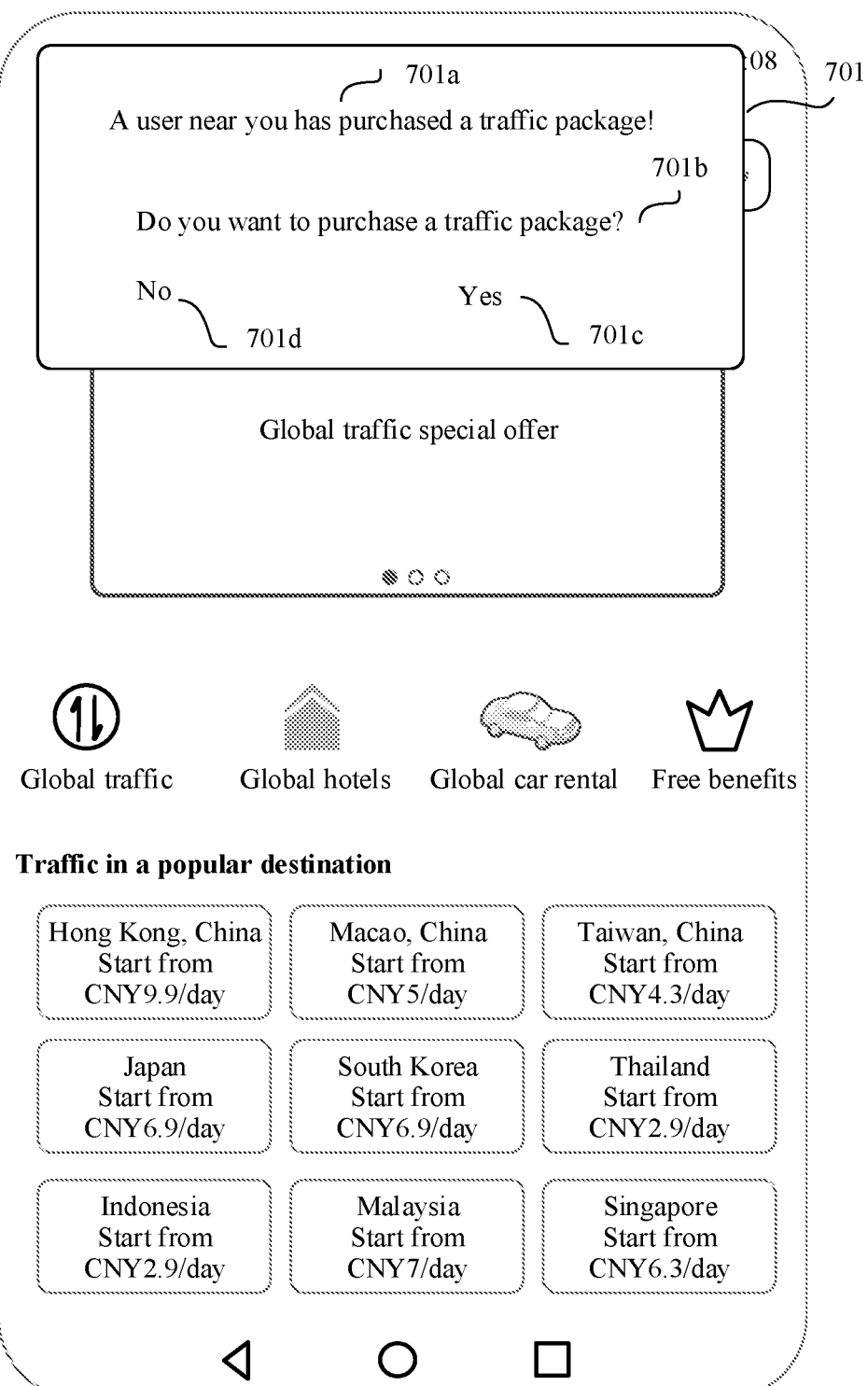
FIG. 7A and FIG. 7B show a group of user interfaces implemented on an electronic device 200 according to an embodiment of this application.
Figure 7B:
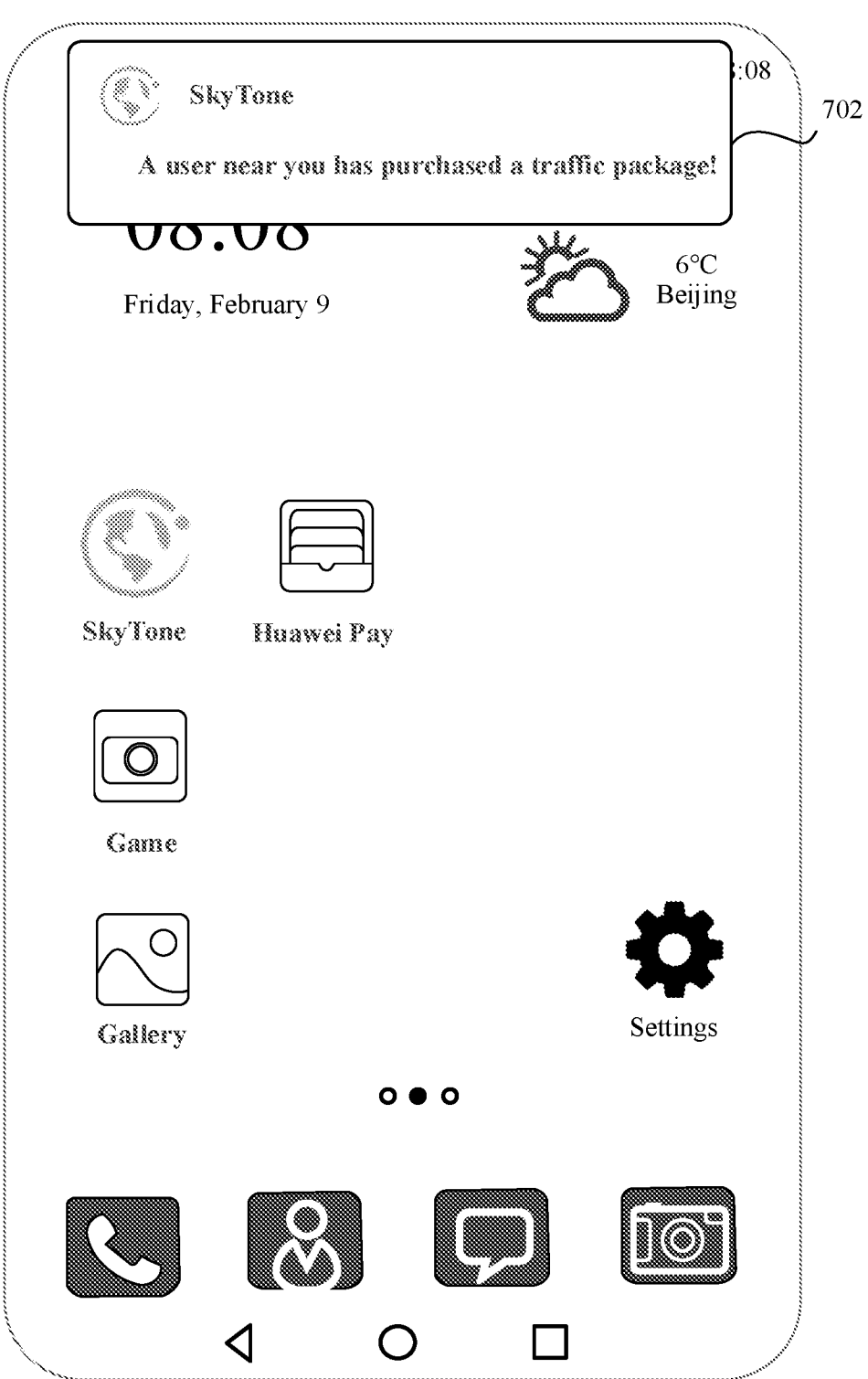

For example, FIG. 7A and FIG. 7B each show prompt information immediately displayed on a display after an electronic device 100 receives and parses a short-range message.

FIG. 7A shows a user interface 71 provided after the electronic device 200 receives and parses a short-range message in a process of running the first application. As shown in FIG. 7A, the user interface 71 may include: a home page provided by SkyTone and a prompt window 701. For the home page provided by SkyTone, refer to the related descriptions in the foregoing embodiment. Details are not described herein again. The prompt window 701 includes a text 701a, and the text 701a may be, for example, "A user near you has purchased a traffic package". The text 701a displayed on the SkyTone home page is prompt information. A location of the text 701a (that is, the SkyTone home page) is used to indicate the first application (that is, SkyTone), and content of the text 701a is used to indicate a notification scenario (that is, purchasing a traffic package). In some embodiments, the prompt window 701 may further include a text 701b, a control 701c, and a control 701d. For example, the text 701b may ask "Do you want to purchase a traffic package?". The control 701c may be used to monitor a user operation (for example, a tap operation). The electronic device 200 may display, in response to the user operation, an interface for purchasing a traffic package. The control element 701d may be used to monitor a user operation (for example, a tap operation). The electronic device 200 may stop displaying the prompt window 701 in response to the user operation. In this way, a feature of a notification scenario may be fully used, and activeness of a user in the first application is improved.

FIG. 7B shows a user interface 72 provided after the electronic device 200 parses and receives the short-range message. The user interface 72 may be provided when the electronic device 200 runs the first application in the background, or may be provided when the electronic device 200 does not run the first application. This is not limited herein. As shown in FIG. 7B, when displaying a home screen, the electronic device may display prompt information 702 on the top of the home screen. The prompt information 702 may include: an icon and/or a name of the first application (for example, SkyTone), and a text that "A user near you has purchased a traffic package!". The icon and/or the name of the first application may be used to indicate the first application, and the text that "A user near you has purchased a traffic package!" is used to indicate a notification scenario.

In addition to the user interfaces shown in FIG. 7A and FIG. 7B, the electronic device 200 may further display prompt information on another user interface. For example, the electronic device 100 may further display prompt information on another interface provided by the first application.

It may be understood that FIG. 7A and FIG. 7B show only an example of a manner in which the notification scenario of "purchasing a traffic package" in "SkyTone" is prompted. When the electronic device 100 sends a short-range message based on another application, the electronic device 200 may output prompt information in different manners. This is not limited in this embodiment of this application.

In some other embodiments of this application, the electronic device 200 may determine, based on a situation, whether to output prompt information or not. Specifically, after receiving a short-range message, when the electronic device 200 receives, again within a preset time period (for example, 10 minutes or 20 minutes), another short-range message (including short-range messages sent by the electronic device 100 and another electronic device) that indicates a notification scenario the same as that indicated by the short-range message, the electronic device 200 no longer outputs prompt information based on the another short-range message. Herein, the another short-range message that is received by the electronic device 100 within the preset time period and that indicates a notification scenario (for example, a first scenario) the same as that indicated by the short-range message may alternatively be referred to as a second message. The preset time period may be preset. This is not limited in this embodiment of this application. In this way, frequency of outputting same prompt information by the electronic device 200 may be reduced, so that a user can be prompted more concisely and conveniently and have better user experience.

In still some embodiments of this application, the electronic device 200 may periodically output prompt information.

In an implementation, the electronic device 200 may further collect statistics on short-range messages that indicate a notification scenario and that are received from another electronic device (not limited to the electronic device 100) based on the first application within a first preset periodicity. In addition, the electronic device 200 outputs prompt information once every first preset periodicity. The prompt information is used to indicate the first application and the notification scenario indicated by the short-range messages that are obtained through statistics collection within the first preset periodicity. Herein, the notification scenario may be referred to as a first scenario. A short-range message that is received by the electronic device 200 from the electronic device 100 within the first preset periodicity and that indicates the first scenario may be referred to as a first message. A short-range message that is received by the electronic device 200 from another electronic device other than the electronic device 100 within the first preset periodicity and that indicates the first scenario may be referred to as a third message. For example, the electronic device 200 may output prompt information on a display, and the prompt information may be a text that "Seven users near you have purchased a traffic package". In this way, frequency of outputting same prompt information by the electronic device 200 may be reduced, so that a user can be prompted more concisely and conveniently and have better user experience.

In another implementation, the electronic device 200 may collect statistics on all short-range messages that are received from another electronic device (not limited to the electronic device 100) based on the first application within a second preset periodicity. In addition, the electronic device 200 outputs prompt information once every second preset periodicity. The prompt information is used to indicate the first application and notification scenarios respectively indicated by all the short-range messages that are received within the second preset periodicity. Herein, a short-range message that is received by the electronic device 200 from the electronic device 100 within the second preset periodicity and that indicates the first scenario may be referred to as a first message. A short-range message that is received by the electronic device 200 from another electronic device other than the electronic device 100 within the second preset periodicity may be referred to as a fourth message. A notification scenario indicated by the short-range message sent by the another electronic device other than the electronic device 100 is not limited in this embodiment of this application. For example, the electronic device 200 may collect, every 20 minutes or half an hour, statistics on all short-range messages received in the second preset periodicity, and output prompt information based on all the short-range messages. For example, the electronic device 200 may output prompt information on the display, and the prompt information may be a text that "Seven users near you have purchased a traffic package, and two users near you have purchased an air ticket". In this way, a plurality of pieces of prompt information may be integrated together, and frequency of outputting prompt information by the electronic device 200 may be reduced, so that a user can be prompted more concisely and conveniently and have better user experience.

It can be learned with reference to the embodiments in FIG. 2 and FIG. 4 that, after running the first application and identifying the notification scenario, the electronic device 100 may send the short-range message by using the short-range wireless communication technology. Then, each of the electronic device 200 to the electronic device 400 that are located within the communication range of the short-range wireless communication technology used by the electronic device 100 may receive the short-range message. The electronic device 200 on which the first application is installed and the electronic device 300 on which the first application is installed may successfully parse the short-range message, to learn the first application and the notification scenario identified by the electronic device 100. Then, the electronic device 200 on which the "short-range notification function" is enabled may output prompt information based on the first application and the notification scenario that are obtained through parsing.

It can be learned from the application-based short-range notification method described in the embodiment in FIG. 4 that the method provided in this embodiment of this application is independent of the Internet, and transmission of a short-range message can be completed by using only the short-range wireless communication technology. The method provided in this embodiment of this application is directly performed between electronic devices, and no additional server needs to be configured, so that costs of short-range notification are reduced. In addition, a short-range message transmitted between electronic devices carries only an identifier of an application and an identifier of a notification scenario, so that disclosure of privacy data such as personal location information and a personal account of a user can be avoided.

In addition, according to the method provided in this embodiment of this application, a developer of each application function program is supported in customizing a scenario in which a short-range notification is required, so that a user can have more flexible short-range notification experience. In addition, in this embodiment of this application, the short-range notification capability layer of the electronic device may provide a short-range notification and a short-range notification perception service for all users having a short-range notification requirement, and each application does not need to separately provide the short-range notification and the short-range notification perception service, so that power consumption of the electronic device can be reduced.

With reference to modules in a software system of an electronic device, the following describes in detail a collaboration process between modules of the electronic device 100 and the electronic device 200 in a process in which the application-based short-range notification method provided in embodiments of this application is performed.

Figure 8:
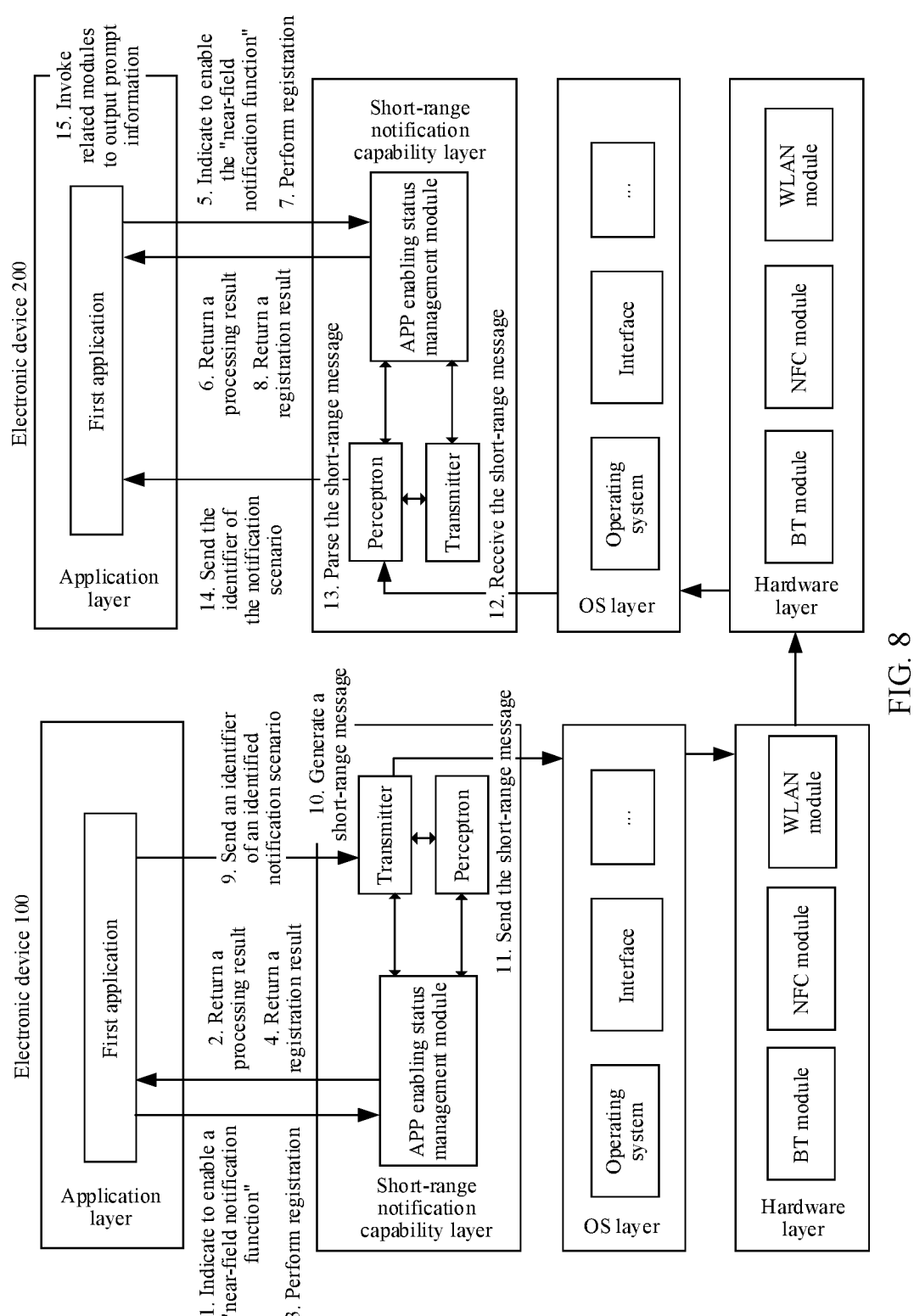
FIG. 8 is a diagram of interaction between internal modules of an electronic device 100 and an electronic device 200 according to an embodiment of this application.

FIG. 8 shows a process of interaction between modules of an electronic device 100 and an electronic device 200 in a process in which an application-based short-range notification method according to an embodiment of this application is performed.

In steps 1 to 6, the electronic device 100 enables a "short-range notification function" of a first application.

Step 1: The first application at an application layer of the electronic device 100 indicates a short-range notification capability layer to enable the "short-range notification function" of the first application; and the short-range notification capability layer enables the "short-range notification function" of the first application based on the indication from the first application.

Specifically, the first application may invoke an interface between the application layer and the short-range notification capability layer, to indicate the short-range notification capability layer to enable the "short-range notification function" of the first application function program.

In some embodiments, an APP enabling status management module in the short-range notification capability layer may store an identifier of the "short-range notification function" of the first application, where the identifier may be used to indicate enabling/disabling of the "short-range notification function" of the first application. For example, when the identifier is a number "1", it may indicate that the "short-range notification function" of the first application is in an enabled state; and when the identifier is a number "0", it may indicate that the "short-range notification function" of the first application is in a disabled state.

Step 2: The short-range notification capability layer returns a processing result of the "short-range notification function" to the first application at the application layer.

Step 3: The first application at the application layer is registered with the short-range notification capability layer; and after the "short-range notification function" of the first application is enabled, the short-range notification capability layer accepts the registration from the first application at the application layer.

Step 4: The short-range notification capability layer returns a registration result to the first application at the application layer.

After steps 1 to 4 are performed, the electronic device 100 may enable the "short-range notification function" of the first application, to send or receive a short-range message.

In steps 5 to 8, the electronic device 200 enables the "short-range notification function" of the first application.

Steps 5 to 8 are similar to steps 1 to 4. For details, refer to the related descriptions.

Step 9: The first application at the application layer of the electronic device 100 identifies a notification scenario, and sends an identifier of the identified notification scenario to the short-range notification capability layer, to notify the short-range notification capability layer of the currently identified notification scenario.

Step 10: The short-range notification capability layer of the electronic device 100 receives the identifier of the notification scenario identified by the first application, and determines whether the "short-range notification function" of the first application is enabled; and when determining that the "short-range notification function" of the first application is enabled, the short-range notification capability layer generates a short-range message.

Specifically, the APP enabling status management module at the short-range notification capability layer of the electronic device 100 may determine whether the "short-range notification function" of the first application is enabled; and after determining that the "short-range notification function" is enabled, a transmitter may be configured to generate a short-range message. For a format and content of the short-range message, refer to the foregoing related descriptions.

Step 11: The short-range notification capability layer of the electronic device 100 invokes related modules of an OS layer and a hardware layer to send the short-range message.

Specifically, the transmitter at the short-range notification capability layer of the electronic device 100 may invoke the related modules at the OS layer and the hardware layer to send the short-range message. For example, the transmitter invokes a Bluetooth (BT) module, an NFC module, a WLAN module, or a ZigBee module to send the short-range message.

Step 12: A Bluetooth (BT) module, an NFC module, a WLAN module, or a ZigBee module at a hardware layer of the electronic device 200 receives the short-range message sent by the electronic device 100, and transfers the short-range message to a short-range notification capability layer through an OS layer interface.

Step 13: The short-range notification capability layer of the electronic device 200 parses the received short-range message, obtains the identifier of the application and the identifier of the notification scenario that are carried in the short-range message, and determines the first application based on the identifier of the application.

Specifically, a perceptron in the electronic device 200 may parse the received short-range message, to obtain the identifier of the application and the identifier of the notification scenario that are carried in the short-range message.

Step 14: The short-range notification capability layer of the electronic device 200 determines whether the "short-range notification function" of the first application is enabled; and when determining that the "short-range notification function" of the first application is enabled in the electronic device 200, the short-range notification capability layer sends, to the first application at the application layer, the identifier that is of the notification scenario and that is obtained through parsing.

Specifically, an APP enabling status management module at the short-range notification capability layer of the electronic device 200 may determine whether the "short-range notification function" of the first application is enabled.

Step 15: The first application at the application layer receives the identifier of the notification scenario, and determines a corresponding notification scenario based on the identifier of the notification scenario; and then, the first application at the application layer invokes related modules to output prompt information.

Herein, for a specific implementation in which the first application at the application layer invokes the related modules to output the prompt information, refer to the foregoing related descriptions. Details are not described herein again.

The implementations of this application may be randomly combined, to achieve different technical effects.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the processes or the functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Disk), or the like.

A person of ordinary skill in the art may understand that all or some of the processes in the methods in the foregoing embodiments may be implemented by using a computer program to instruct related hardware. The program may be stored in a computer-readable storage medium. When the program is executed, the processes in the foregoing method embodiments may be performed. The foregoing storage medium includes: any medium that can store program code, such as a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. An application-based short-range notification method, wherein the method comprises:

running, by a first device, a first application, and identifying a first scenario associated with a user action detected when the first application is running; and sending, by the first device, a first message to a second device by using a short-range wireless communication technology, wherein the first message carries an identifier of the first application and an identifier of the first scenario, wherein the identifier of the first application identifies the first application and the identifier of the first scenario identifies the user action detected when the first application is running; wherein the first application is installed on the first device.

2. The method according to claim 1, wherein the first message comprises an advertising packet.

3. The method according to claim 2, wherein the advertising packet comprises an advertising data part, the advertising data part comprises a first field and a second field, the first field carries the identifier of the first application, and the second field carries the identifier of the first scenario.

4. The method according to claim 1, wherein before the first device identifies the first scenario, the method further comprises:

detecting, by the first device, a first operation, and enabling a short-range notification function in response to the first operation, wherein the short-range notification function is used by the first device to identify the first scenario and send the first message.

5. The method according to claim 1, wherein the first scenario is preset, or the first scenario is updated in real time.

6. An application-based short-range notification method, wherein the method comprises:

receiving, by a second device by using a short-range wireless communication technology, a first message sent by a first device, wherein the first message carries an identifier of a first application and an identifier of a first scenario, wherein the identifier of the first application identifies the first application and the identifier of the first scenario identifies a user action detected when the first application is running;

determining, by the second device, the first application and the first scenario based on the first message; and outputting, by the second device, prompt information, wherein the prompt information indicates the first application and the first scenario, wherein the first application is installed on the second device.

7. The method according to claim 6, wherein the first message comprises an advertising packet.

8. The method according to claim 7, wherein the advertising packet comprises an advertising data part, the advertising data part comprises a first field and a second field, the first field carries the identifier of the first application, and the second field carries the identifier of the first scenario.

9. The method according to claim 6, wherein before the determining, by the second device, the first application and the first scenario based on the first message, the method further comprises:

detecting, by the second device, a second operation, and enabling a short-range notification function in response to the second operation, wherein the short-range notification function is used by the second device to determine the first application and the first scenario based on the first message.

10. The method according to claim 6, wherein the prompt information comprises one or more of the following: an interface element displayed on a display, audio played by an audio module, a vibration prompt generated by a motor, or a flashing prompt of a flash.

11. The method according to claim 6, wherein the method further comprises:

receiving, by the second device, a second message by using the short-range wireless communication technology within a preset time period after receiving the first message, wherein the second message carries the identifier of the first application and the identifier of the first scenario; and determining, by the second device, the first application and the first scenario based on the second message, wherein the prompt information is only used to indicate the first application and indicate the first scenario once.

12. The method according to claim 6, wherein before the outputting, by the second device, prompt information, the method further comprises:

receiving, by the second device, a third message by using the short-range wireless communication technology, wherein the third message carries the identifier of the first application and the identifier of the first scenario, and the first message and the third message are received by the second device within a first preset periodicity; and determining, by the second device, the first application and the first scenario based on the third message, wherein the prompt information is specifically used to indicate the first application and indicate the first scenario twice.

13. The method according to claim 6, wherein before the outputting, by the second device, prompt information, the method further comprises:

receiving, by the second device, a fourth message by using the short-range wireless communication technology, wherein the fourth message carries the identifier of the first application and an identifier of a second scenario, and the first message and the fourth message are received by the second device within a second preset periodicity; and determining, by the second device, the first application and the second scenario based on the fourth message, wherein the prompt information is further used to indicate the second scenario.

14. The method according to claim 6, wherein the first scenario is preset, or the first scenario is updated in real time.

15. An electronic device, wherein the electronic device comprises a display, a memory, and one or more processors, the display and the memory are coupled to the one or more processors, the memory is configured to store computer program code, the computer program code comprises computer instructions that, when executed by the one or more processors, cause the electronic device to perform the following steps:

running, by the electronic device, a first application, and identifying a first scenario associated with a user action detected when the first application is running; and sending, by the electronic device, a first message to a second device by using a short-range wireless communication technology, wherein the first message carries an identifier of the first application and an identifier of the first scenario, wherein the identifier of the first application identifies the first application and the identifier of the first scenario identifies the user action detected when the first application is running; wherein the first application is installed on the electronic device.

16. The electronic device according to claim 15, wherein the first message comprises an advertising packet.

17. The electronic device according to claim 16, wherein the advertising packet comprises an advertising data part, the advertising data part comprises a first field and a second field, the first field carries the identifier of the first application, and the second field carries the identifier of the first scenario.

18. The electronic device according to claim 15, wherein before the electronic device identifies the first scenario, the steps further comprise:

detecting, by the electronic device, a first operation, and enabling a short-range notification function in response to the first operation, wherein the short-range notification function is used by the electronic device to identify the first scenario and send the first message.

19. The electronic device according to claim 15 wherein the first scenario is preset, or the first scenario is updated in real time.

* * * * *